Oct. 18, 1932.  W. WHALEY  1,883,200
SHOVELING MACHINE
Filed Feb. 28, 1930    19 Sheets-Sheet 6
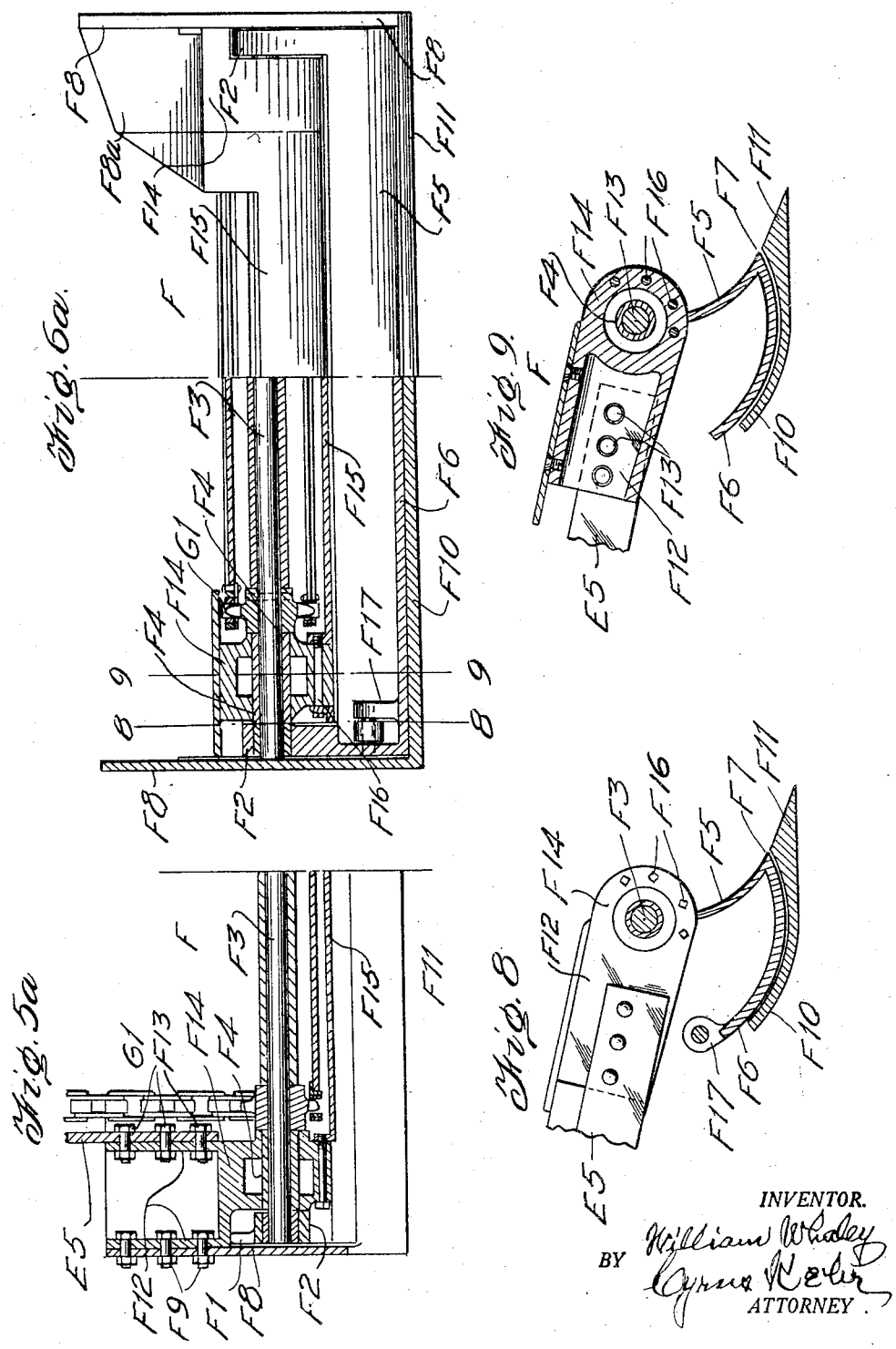
INVENTOR.
William Whaley
BY Cyrus Kehr
ATTORNEY.

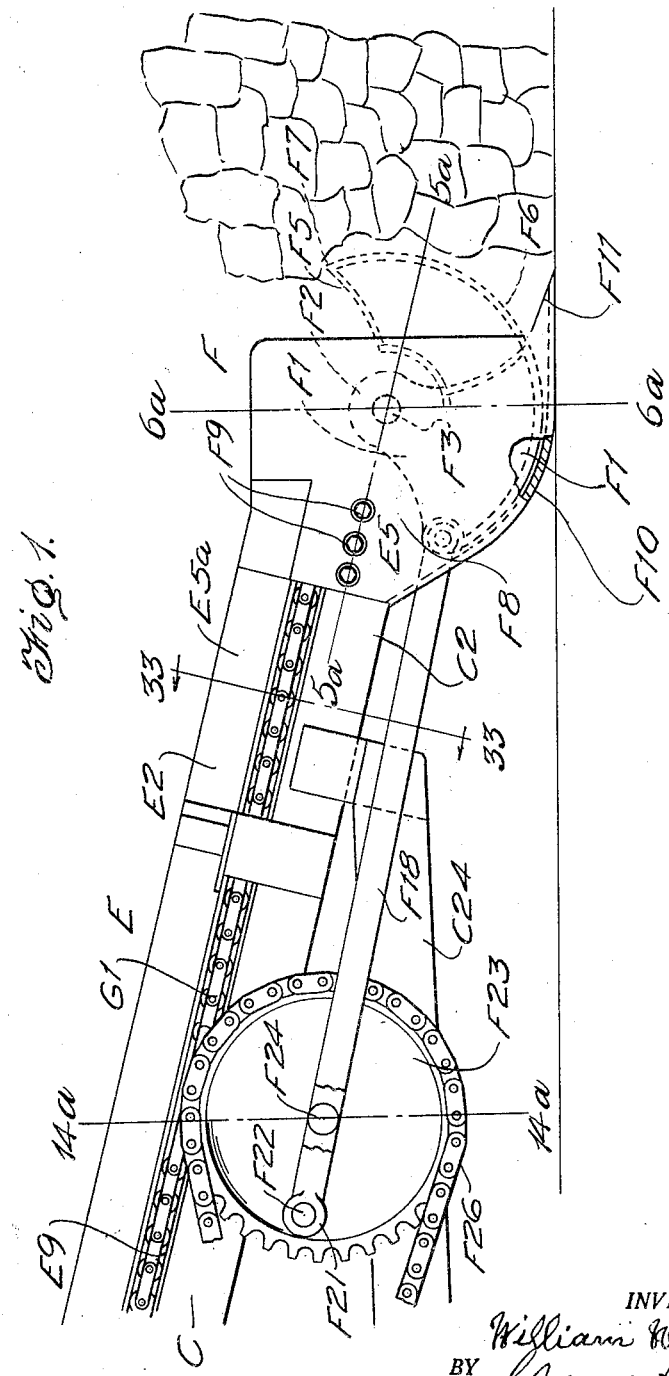

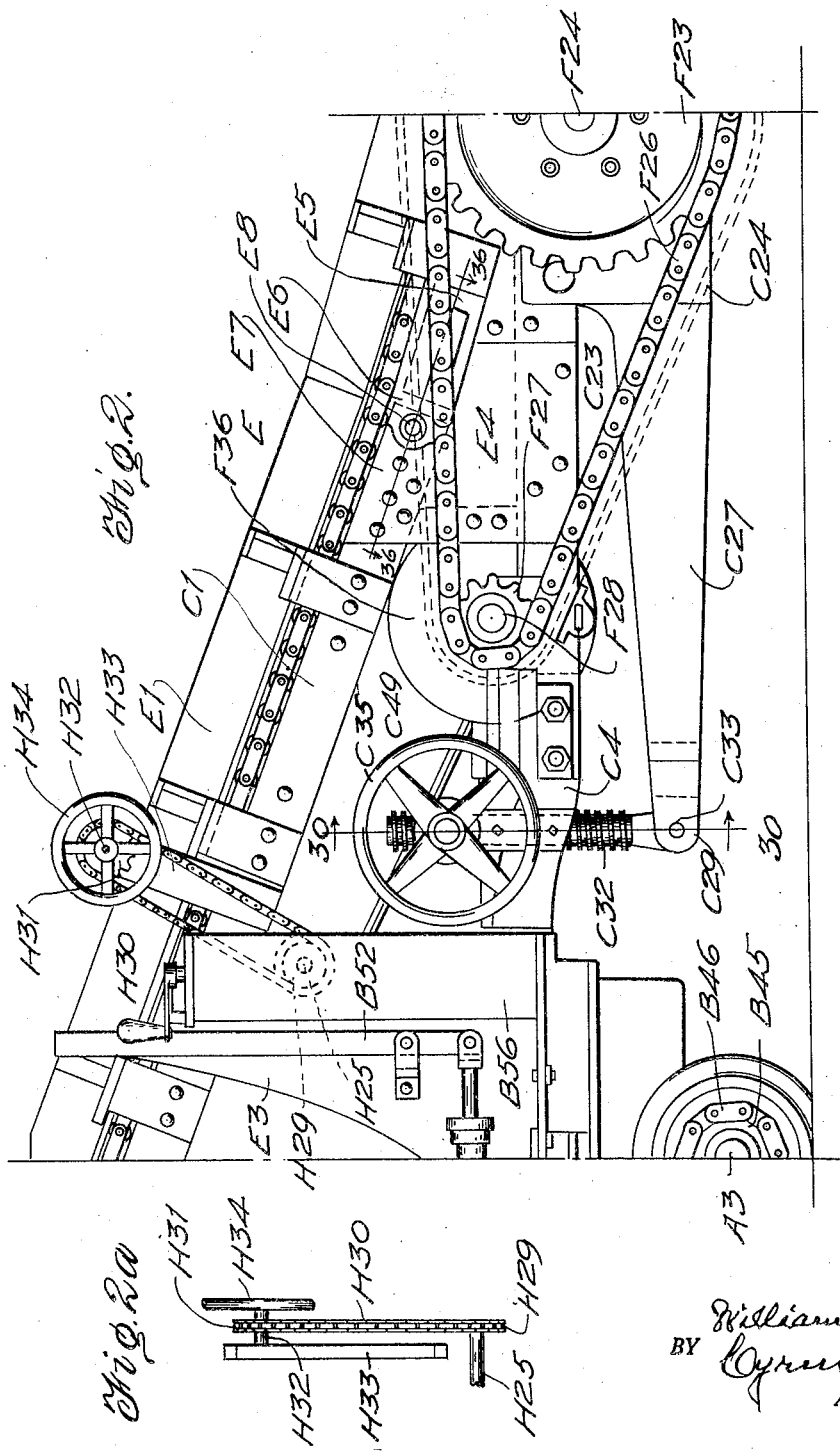

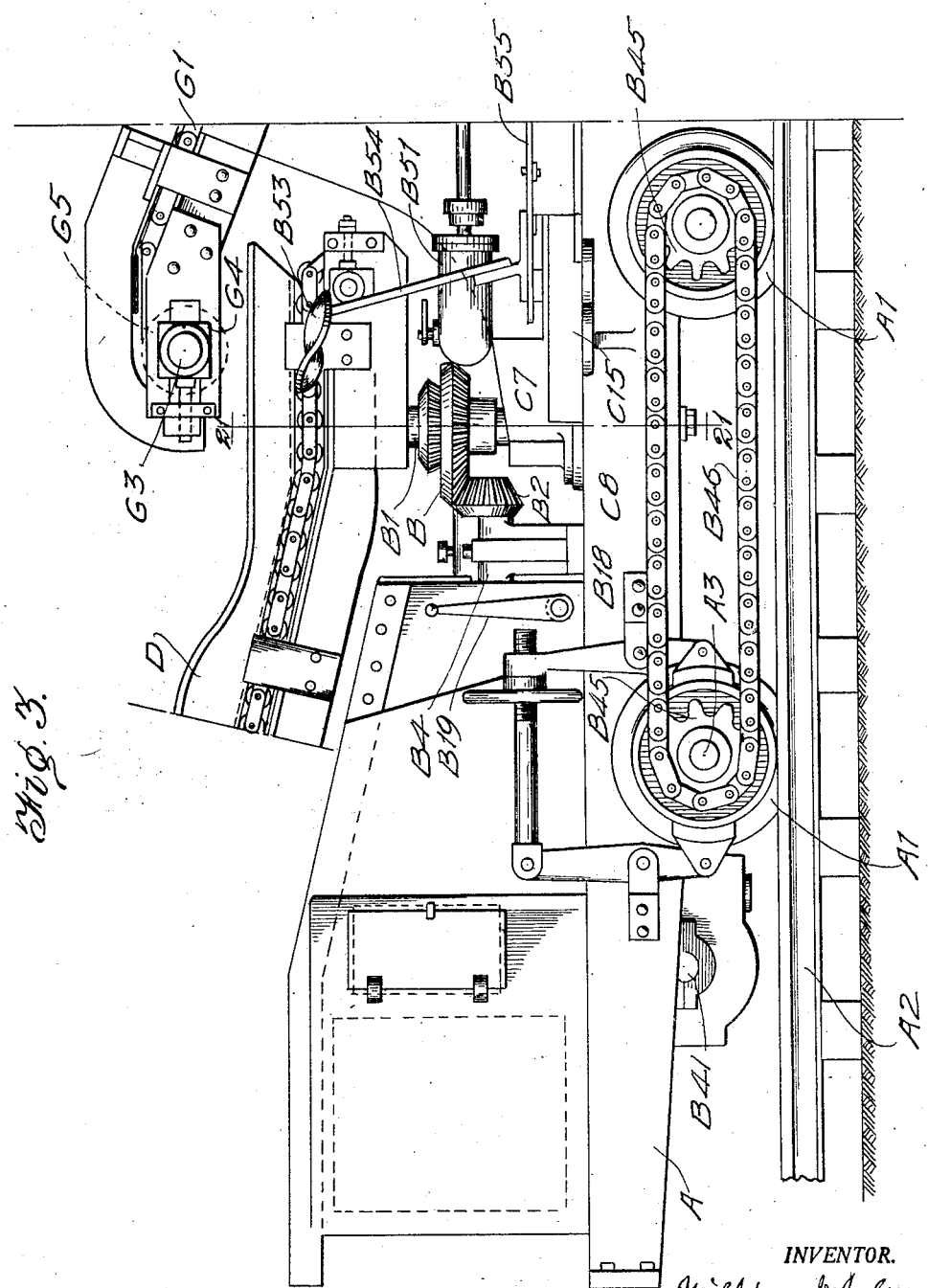

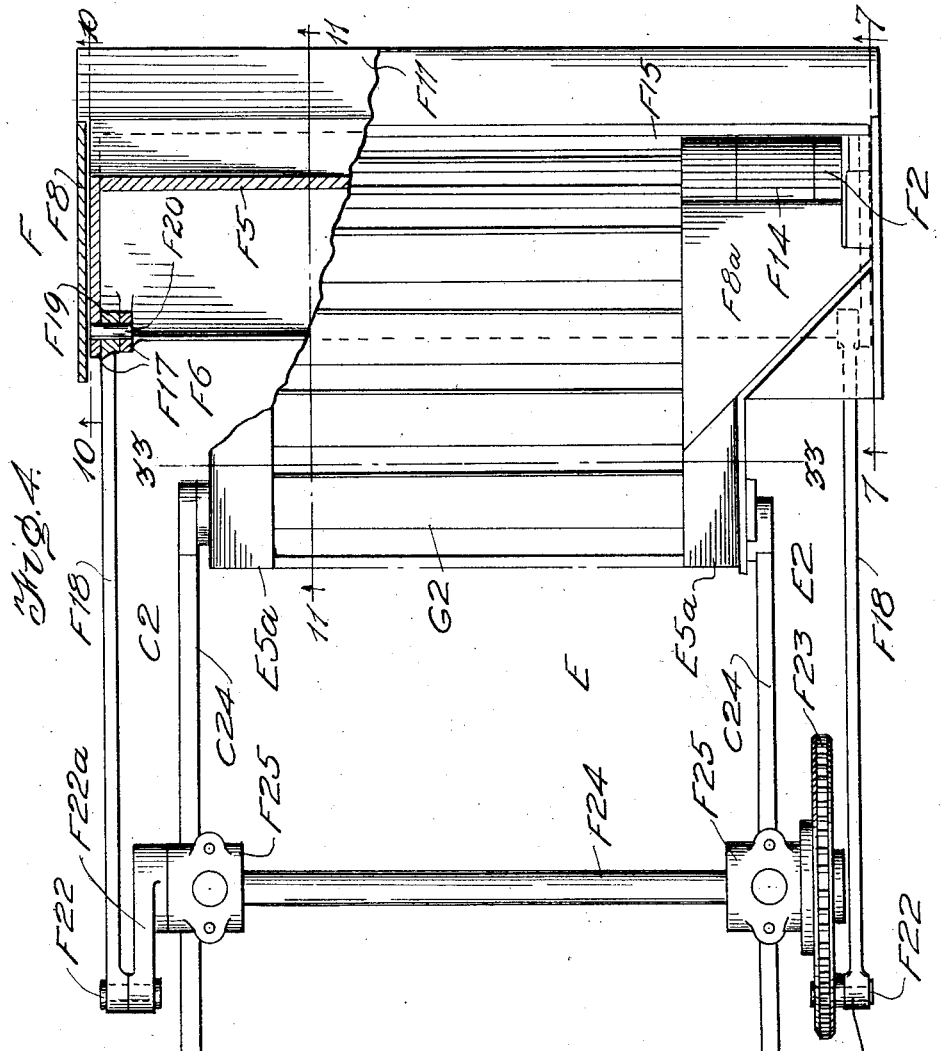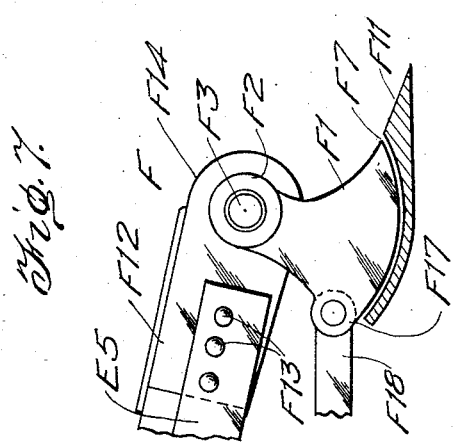

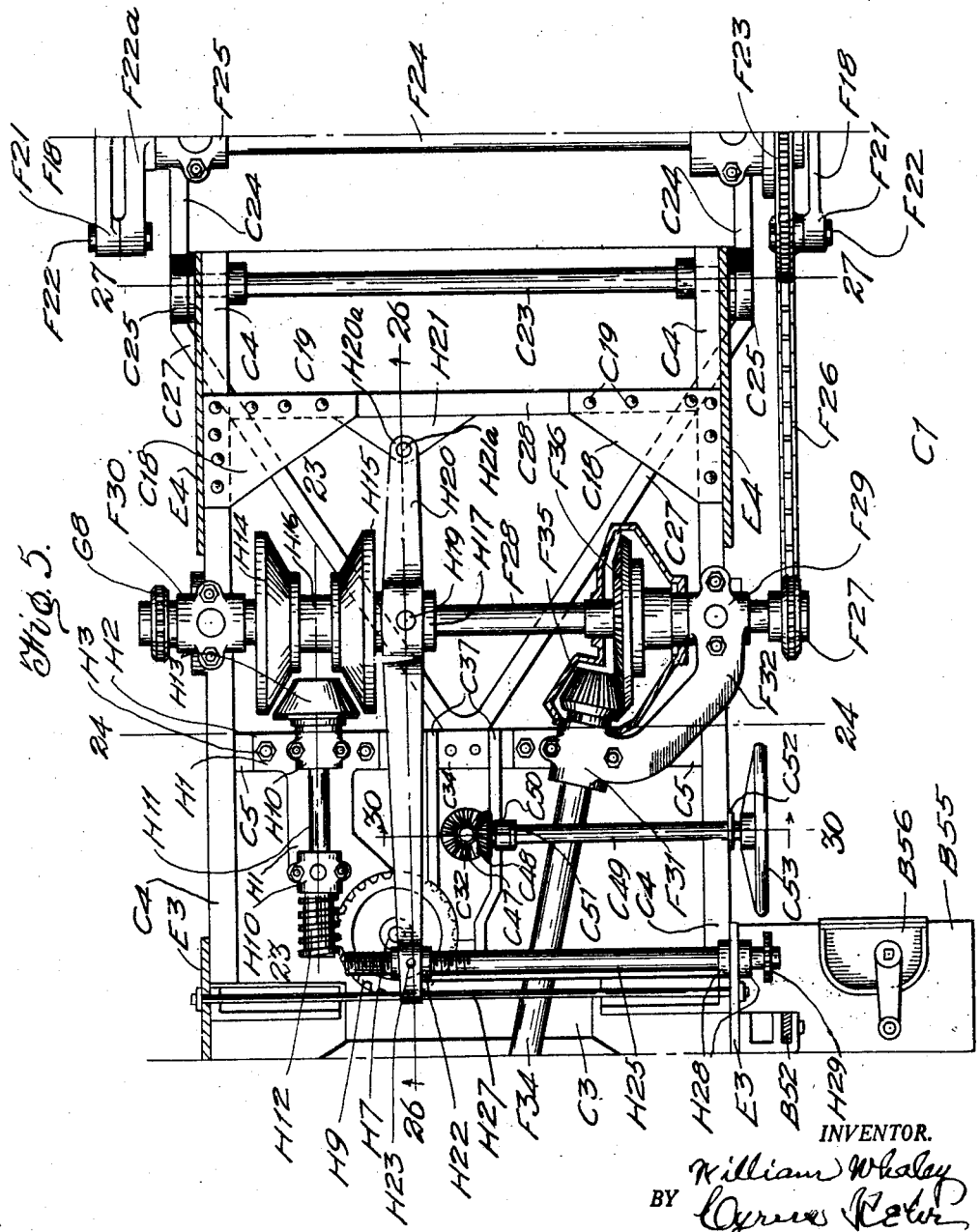

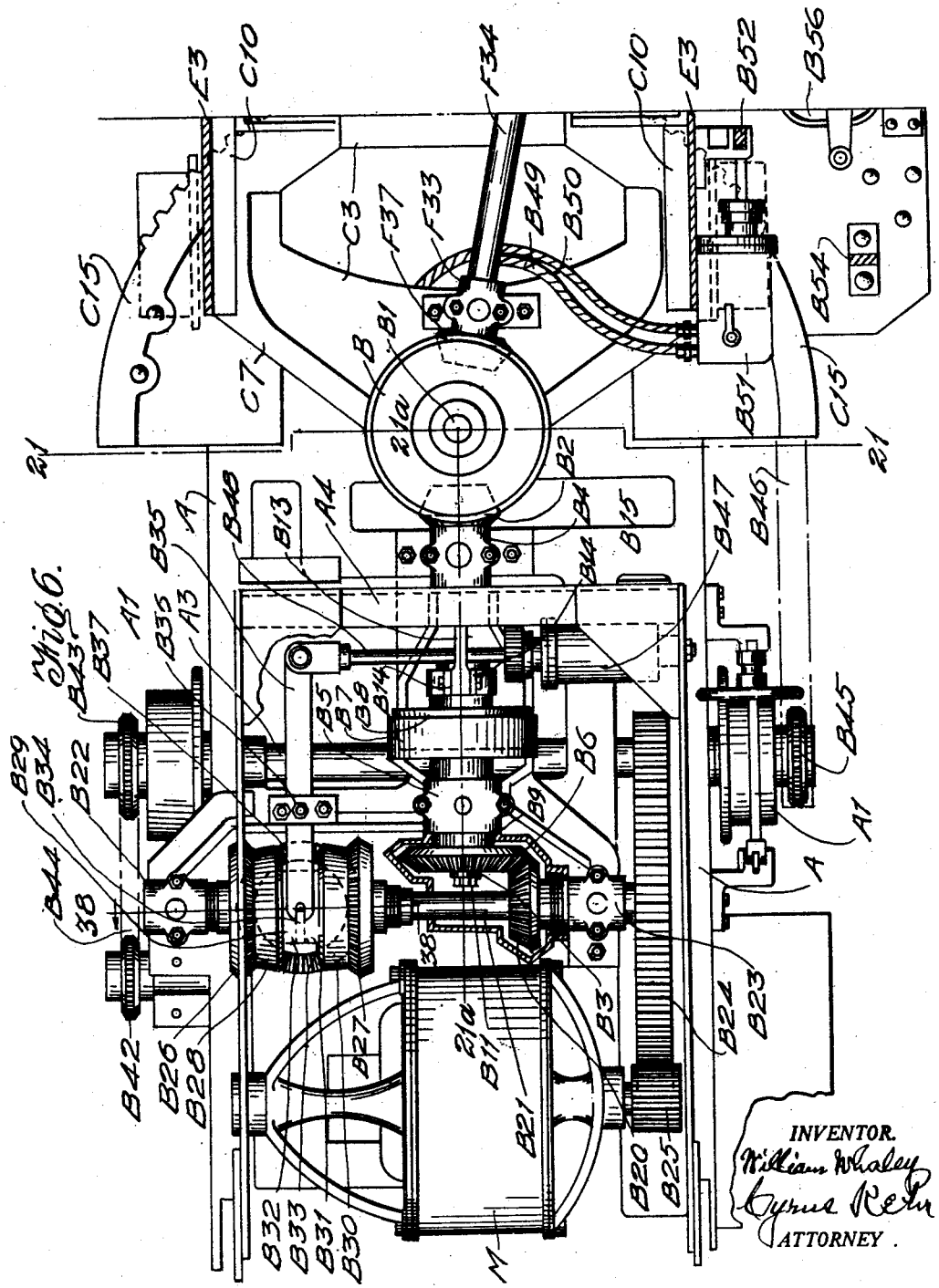

Oct. 18, 1932.  W. WHALEY  1,883,200
SHOVELING MACHINE
Filed Feb. 28, 1930  19 Sheets-Sheet 8
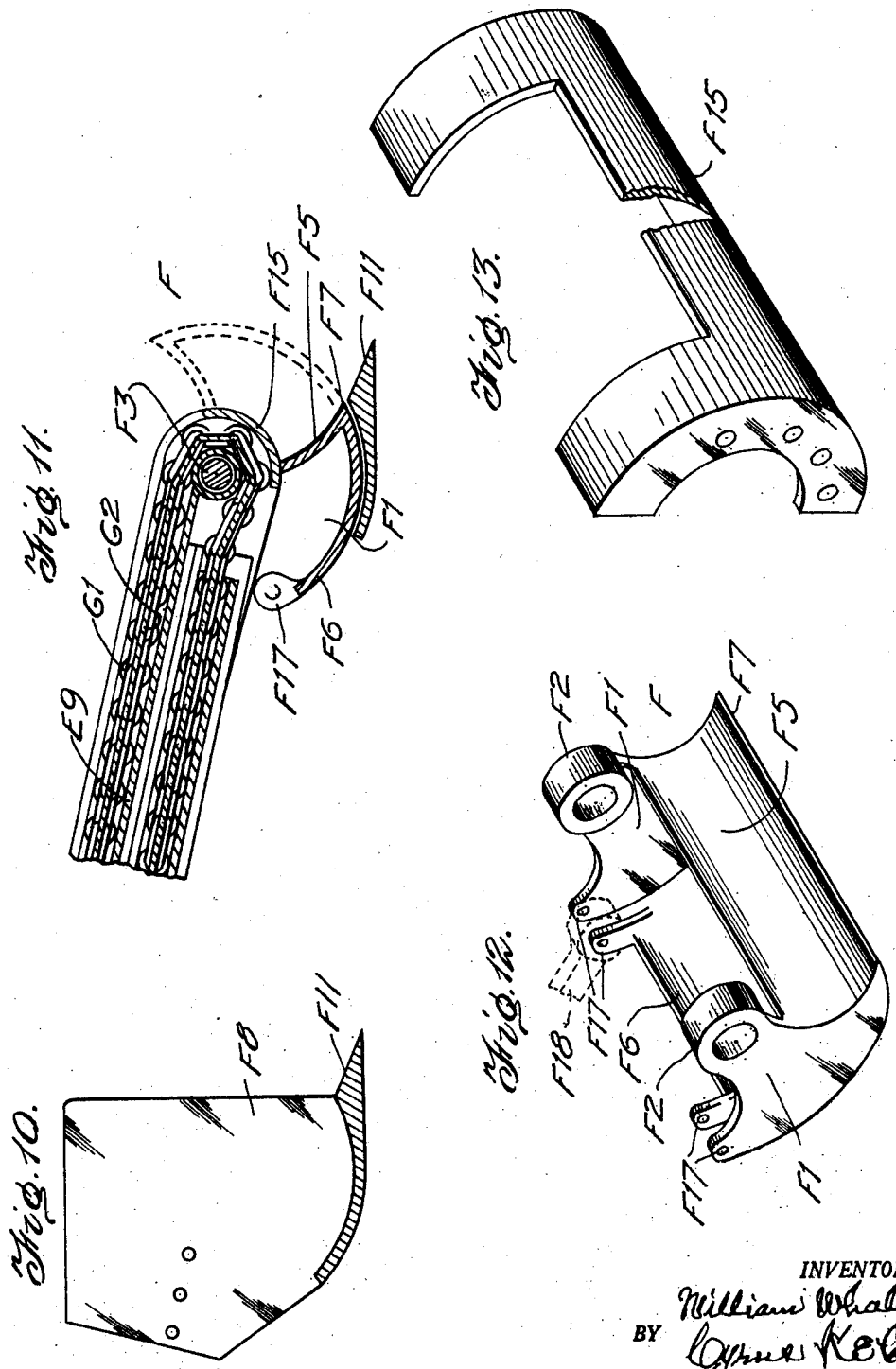

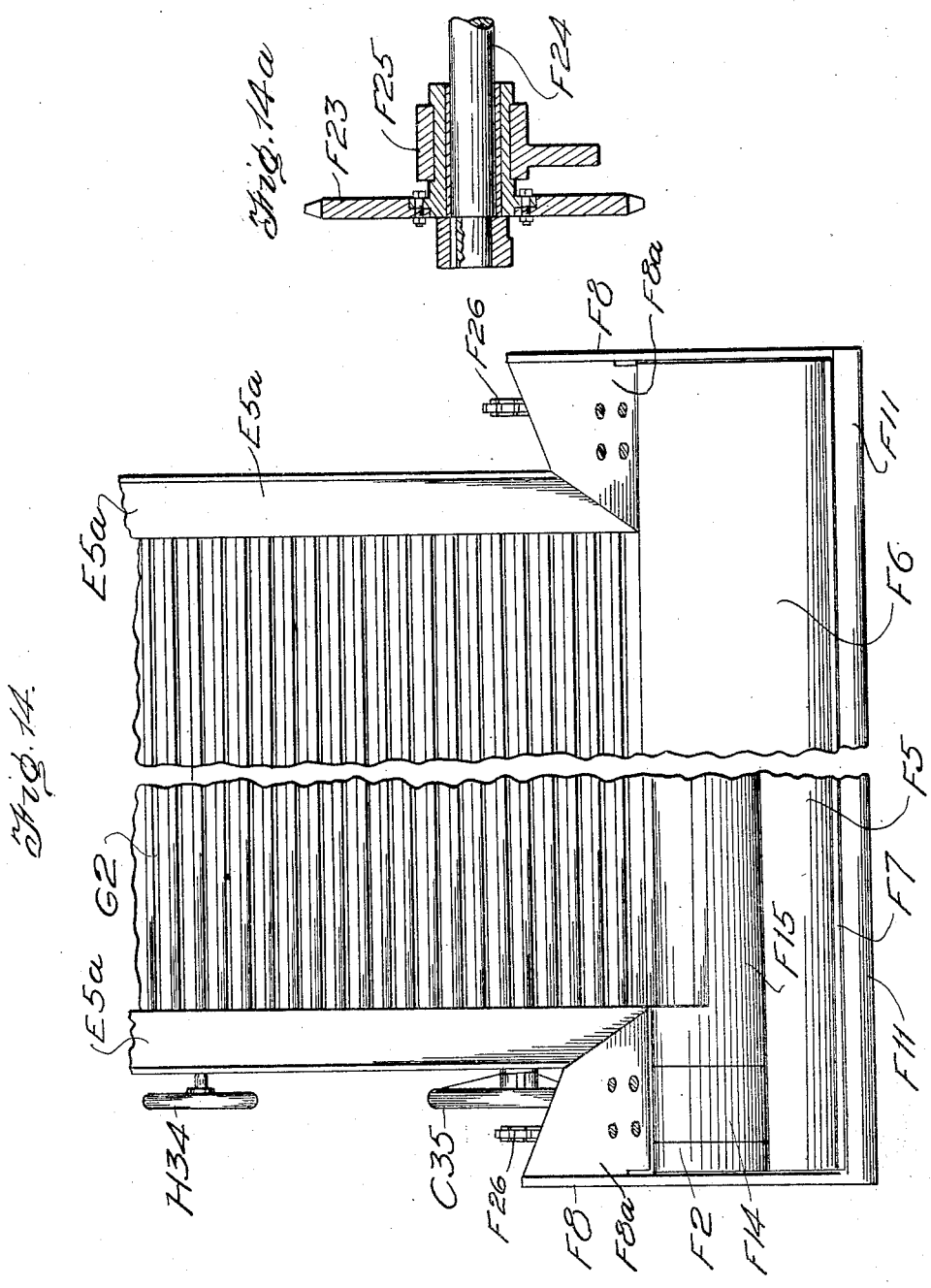

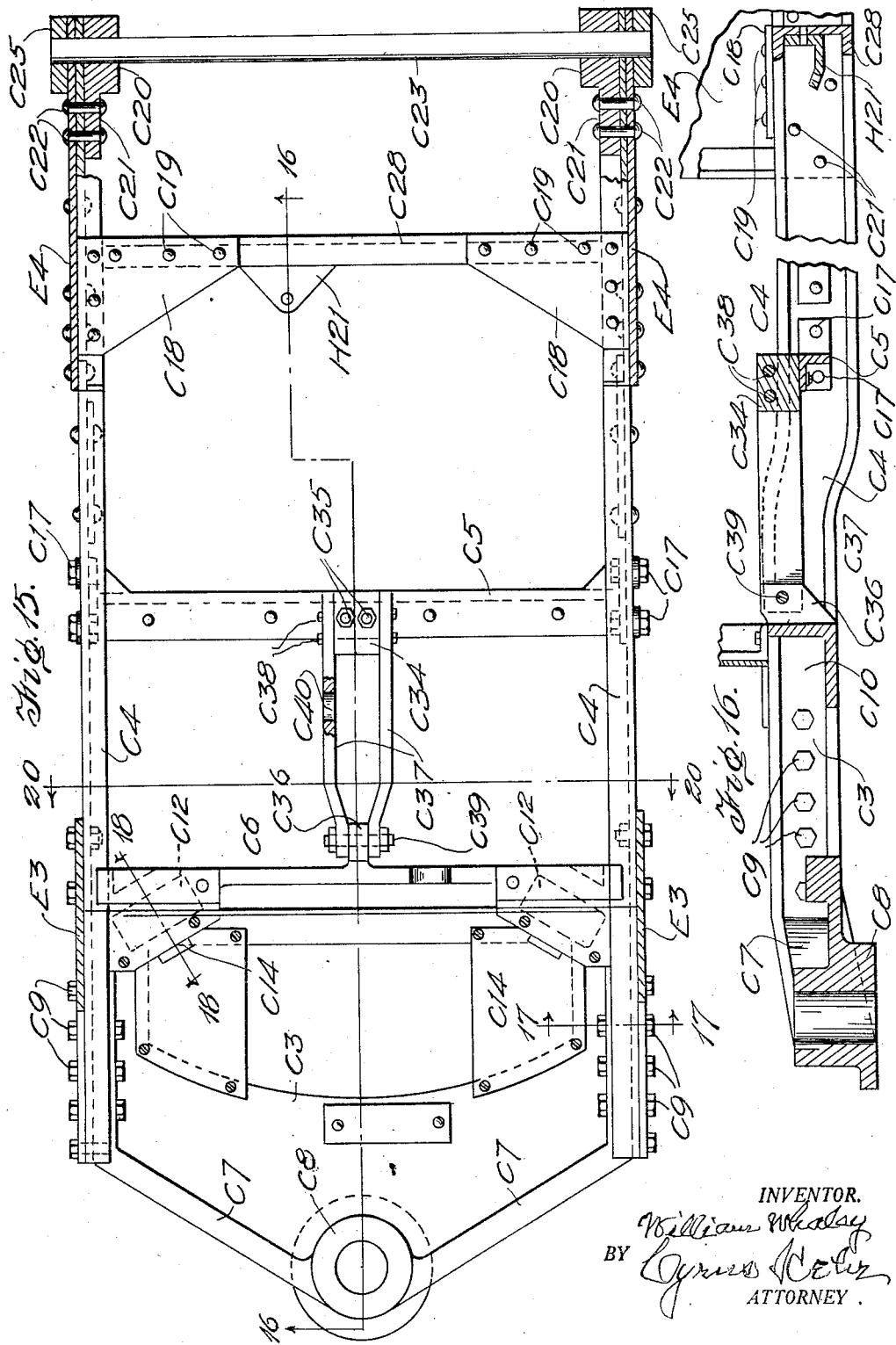

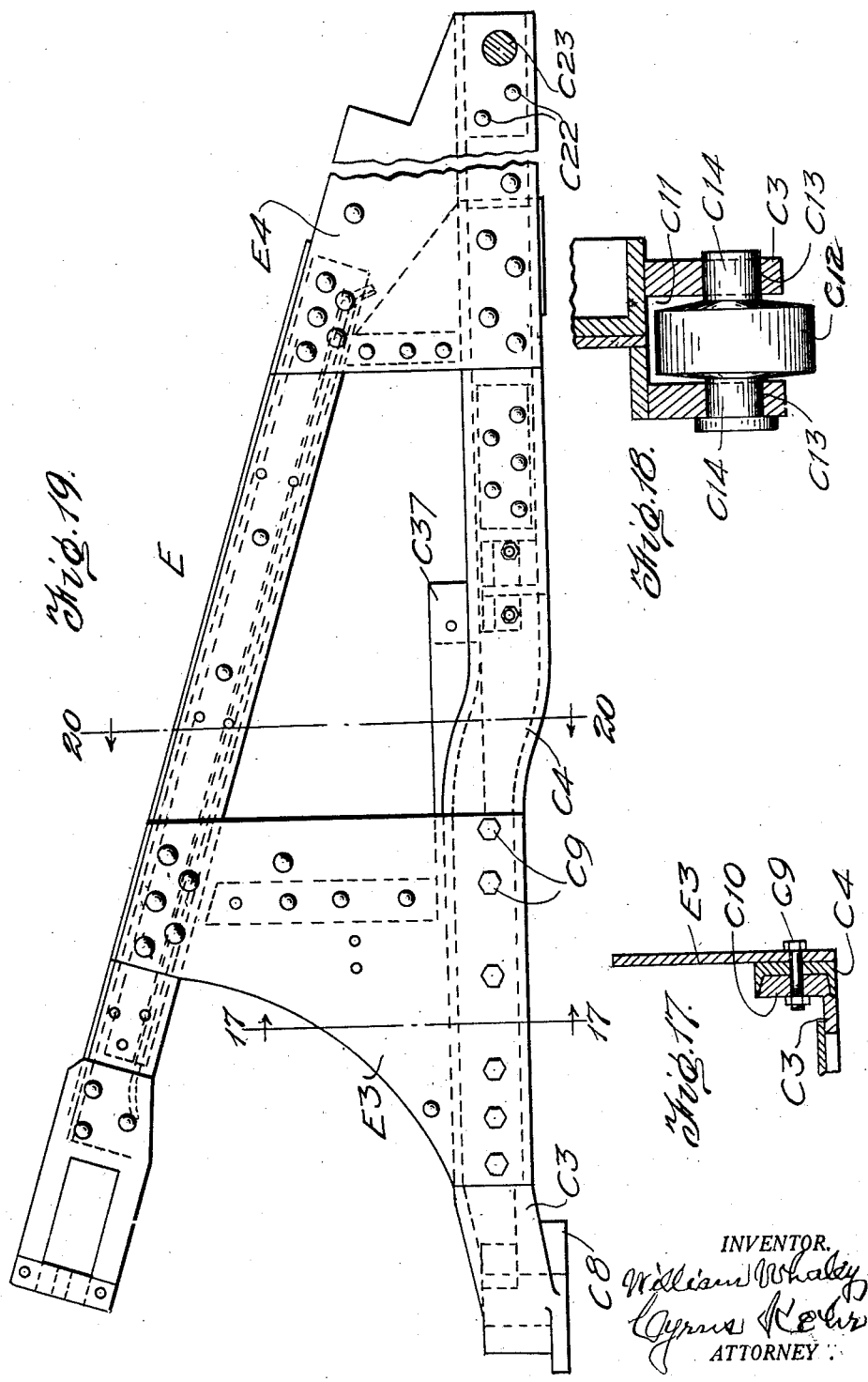

Oct. 18, 1932.  W. WHALEY  1,883,200
SHOVELING MACHINE
Filed Feb. 28, 1930   19 Sheets-Sheet 12

Inventor
William Whaley
By Cyrus Kehr
Attorney

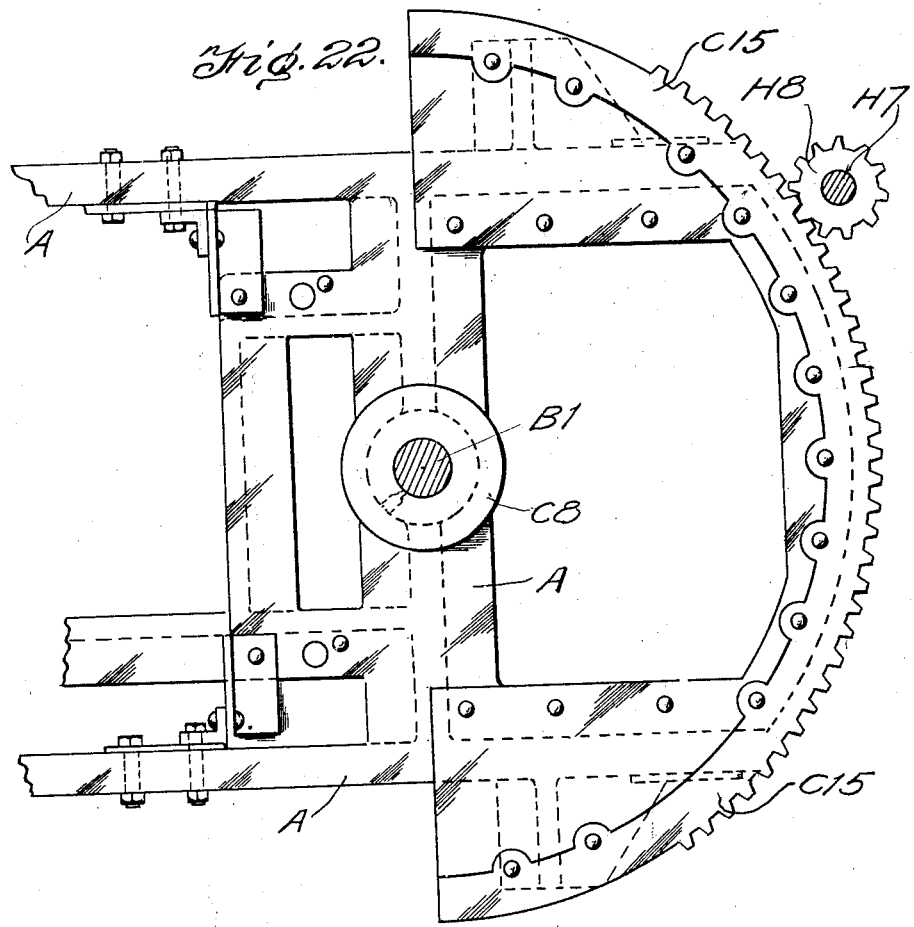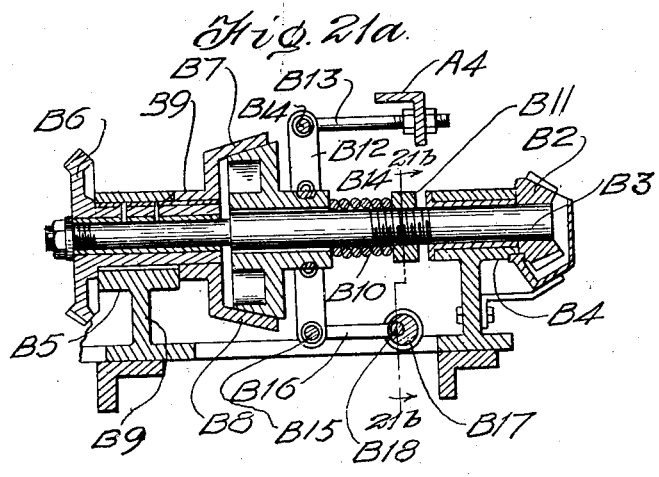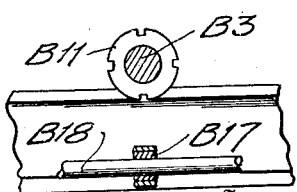

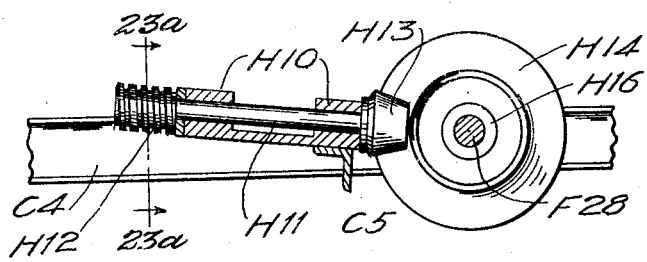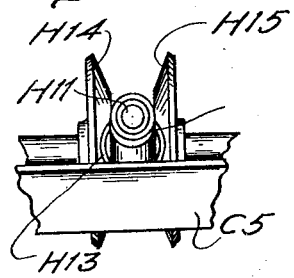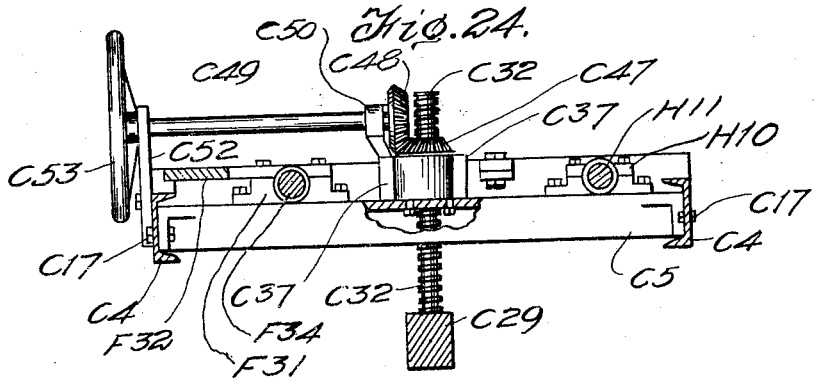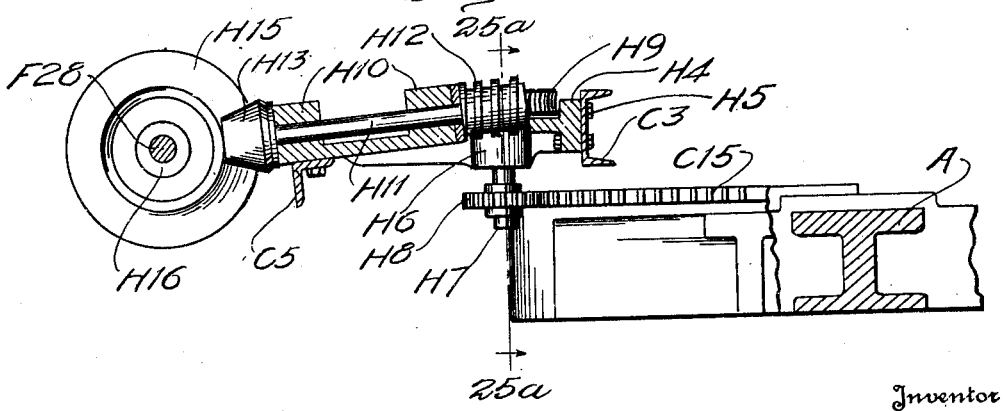

Oct. 18, 1932.   W. WHALEY   1,883,200
SHOVELING MACHINE
Filed Feb. 28, 1930    19 Sheets-Sheet 15
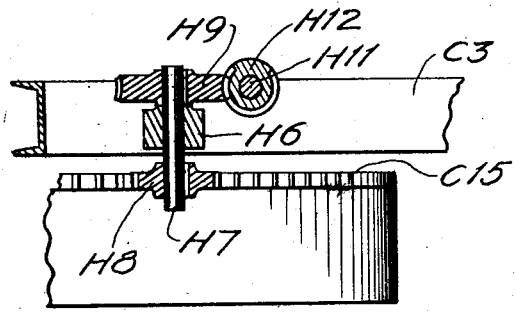
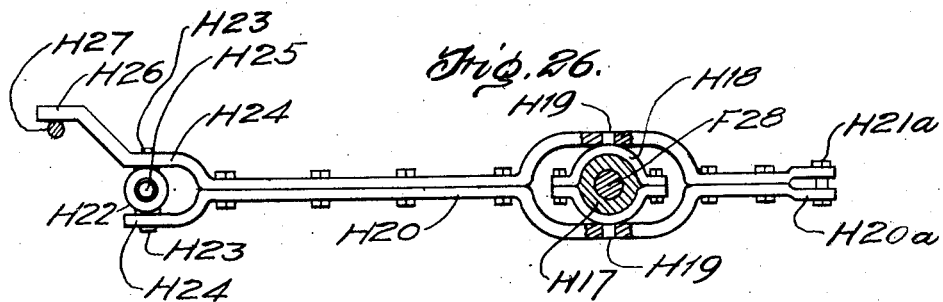
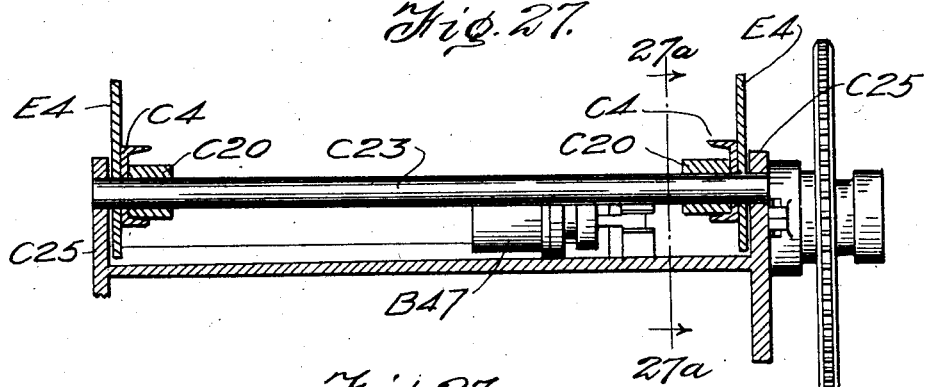

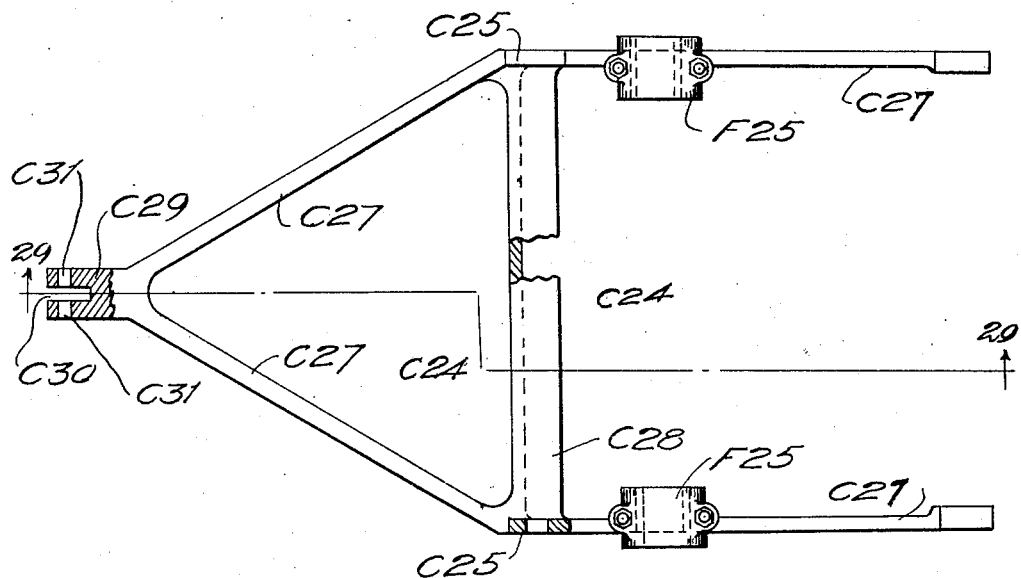
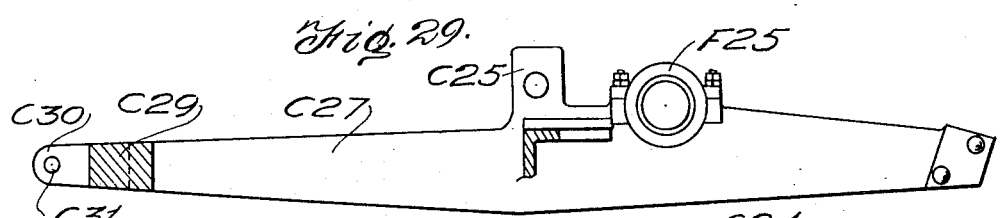
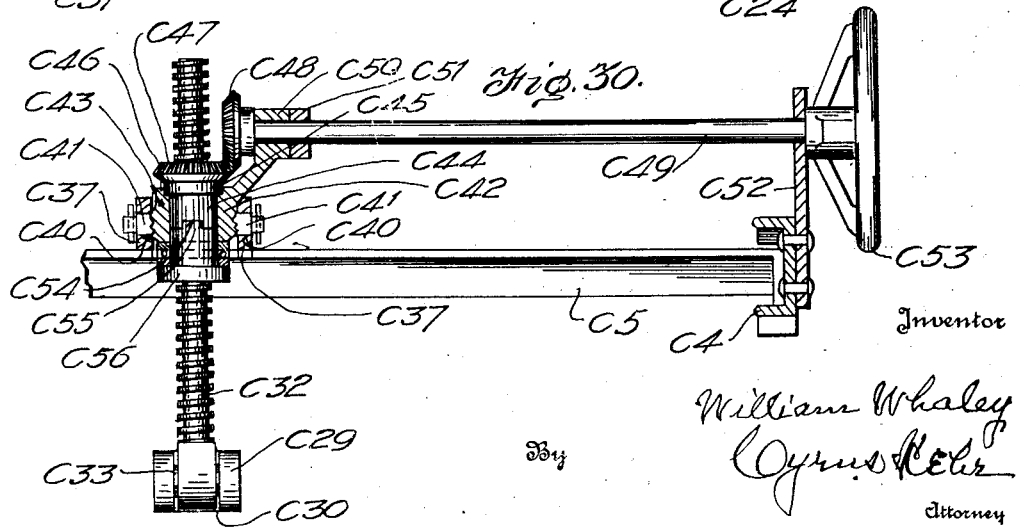

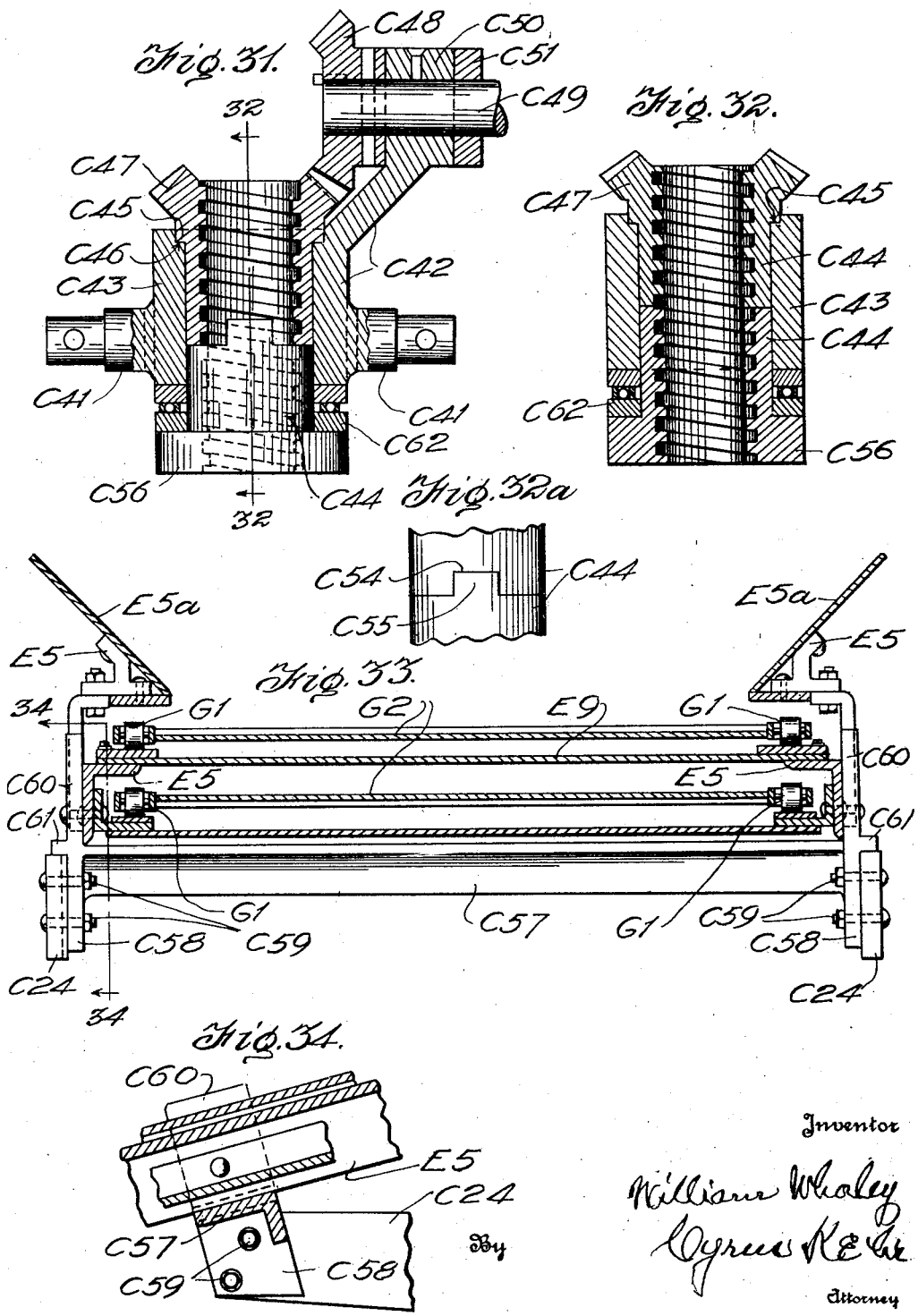

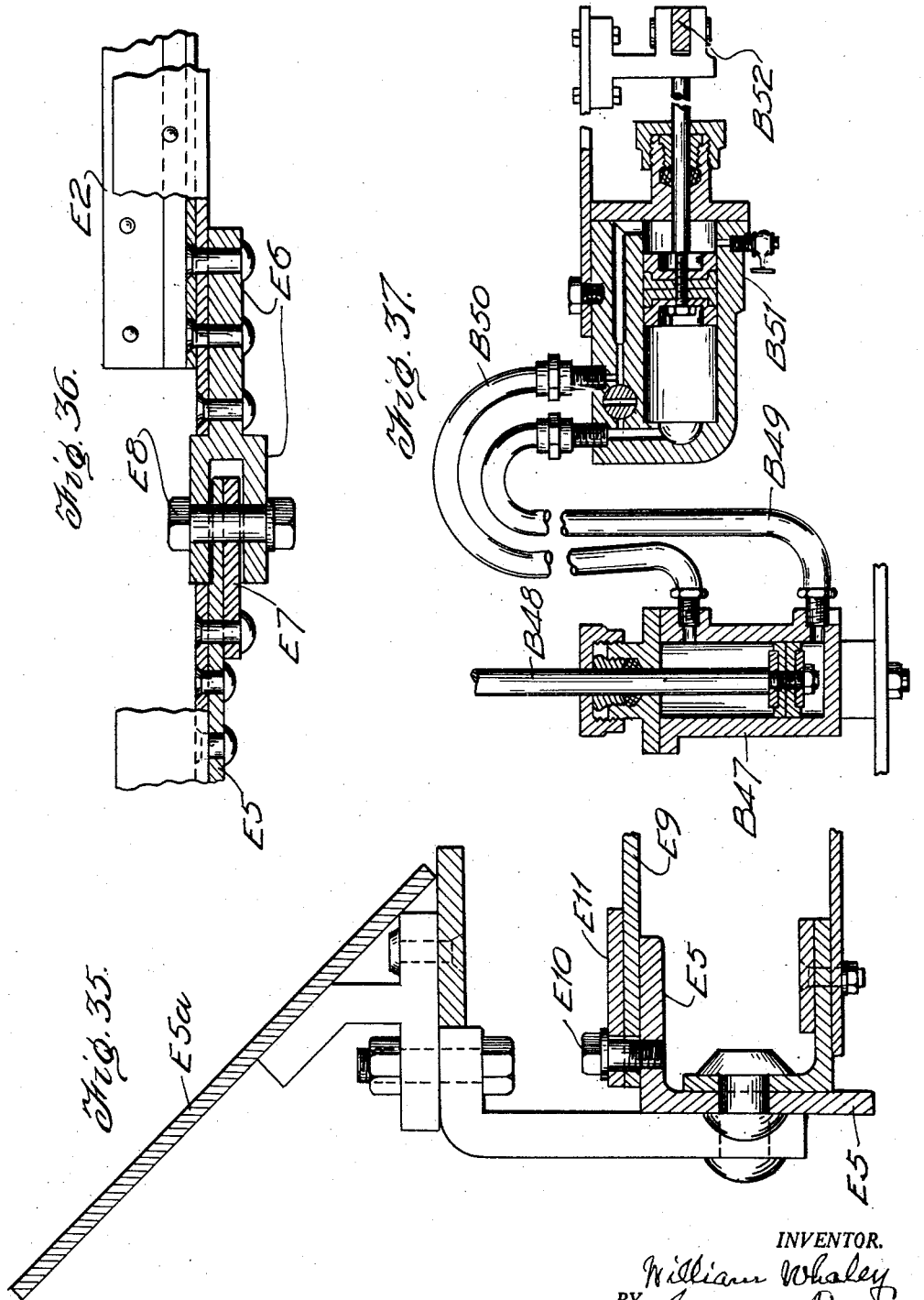

Oct. 18, 1932.   W. WHALEY   1,883,200
SHOVELING MACHINE
Filed Feb. 28, 1930   19 Sheets-Sheet 19

INVENTOR.
William Whaley
BY Cyrus Kehr
ATTORNEY.

Patented Oct. 18, 1932

1,883,200

UNITED STATES PATENT OFFICE

WILLIAM WHALEY, OF KNOXVILLE, TENNESSEE

SHOVELING MACHINE

Application filed February 28, 1930. Serial No. 432,209.

This invention relates particularly to machines for shoveling coal, loose rock, and similar material. For machines of this general type, reference is made to my Letters Patent of the United States, No. 940,999, dated November 23, 1909, and No. 1,379,428, dated May 24, 1921.

The object of this invention is to produce a machine which embodies some of the features of both of the above-mentioned patents. One feature of the present machine is the shovel and associated members formed and combined for continued rapid automatic action of the shovel in a manner preventing the lading material from assuming positions interfering with the action of the shovel. Another feature in the present marhine is a lighter construction of the forward or jib part of the machine. This lightness makes feasible a wider reach of the shovel without destroying the stability of the machine and allows effecting the various movements of the shovel with greater facility and with the application of less power.

Furthermore, the structure of the shovel mechanism and the jib are adapted to manufacture at moderate cost.

The height of the forward end of the jib, whereon the shovel is supported, may be adjusted through a considerable range to allow the shovel to reach the floor or bottom on which the lading material rests. The jib has a wide lateral range. The conveyor belt on the jib discharges the material upon the rear or main conveyor. That conveyor is located on the body of the machine and is intended to discharge into a mine car or elsewhere. The body of the machine is supported on wheels, preferably rail track wheels, which may be turned by power for forward or backward movement of the machine, such movement being under the control of the operator. This propelling mechanism is used for moving the machine from place to place, preferably on rail tracks, and also for relatively short forward and backward movement, as may be needed, during the operation of the machine.

In the accompanying drawings,

Figs. 1, 2 and 3, taken together, show an elevation of the right hand side of a machine embodying my improvement, Fig. 1 showing the forward part, Fig. 2 showing the middle part, and Fig. 3 showing the rear part of said elevation, the rear part of the rear conveyor being omitted;

Fig. 2a is a sectional detail of a part of the structure of Fig. 2;

Figs. 4, 5 and 6 are, respectively, plans of the parts of the machine shown in elevation by Figs. 1, 2 and 3;

Fig. 5a is a horizontal section on the line, 5a—5a, of Fig. 1;

Fig. 6a is an upright section on the line, 6a—6a, of Fig. 1, looking toward the left;

Fig. 7 is an upright longitudinal section on the line, 7—7, of Fig. 4;

Fig. 8 is an upright longitudinal section on the line, 8—8, of Fig. 6a, looking toward the right;

Fig. 9 is an upright longitudinal section on the line, 9—9, of Fig. 6a, looking toward the right;

Fig. 10 is an upright longitudinal section on the line, 10—10, of Fig. 4, looking in the direction of the arrow;

Fig. 11 is an upright longitudinal section on the line, 11—11, of Fig. 4, looking in the direction of the arrow;

Fig. 12 is a perspective of the shovel separated from other members;

Fig. 13 is a perspective of the boot which is fixed adjacent and parallel to the shovel;

Fig. 14 is a front elevation of the front structure as shown in Figs. 1 and 4, the middle part being broken away and the left hand part of the drawings showing the shovel in its lower position, while the right hand part of the drawings show the shovel in its upper position.

Fig. 14a is an upright transverse section on the line, 14a—14a, of Fig. 1, looking toward the left;

Fig. 15 is a plan showing the rear jib section separated from other parts;

Fig. 16 is an upright, longitudinal section on the line, 16—16, of Fig. 15;

Fig. 17 is an upright, transverse section on the line, 17—17, of Figs. 15 and 19, looking toward the right;

Fig. 18 is an upright, enlarged oblique section on the line, 18—18, of Fig. 15;

Fig. 19 is an elevation showing the structure of Fig. 15 with the addition of the rear frame of the jib conveyor;

Fig. 21a is a longitudinal, upright section on the line, 21a—21a, of Fig. 6;

Fig. 21b is an upright section on the line, 21b—21b, of Fig. 21a, looking toward the right;

Fig. 22 is a plan of the forward part of the machine body, the segment gear being in place on said body;

Fig. 23 is a longitudinal section on the line, 23—23, of Fig. 5, looking opposite the direction indicated by the arrows;

Fig. 23a is an upright section on the line, 23a—23a, of Fig. 23;

Fig. 24 is an upright, transverse section on the line, 24—24, of Fig. 5, looking toward the left;

Fig. 25 is a longitudinal section on the line, 23—23, of Fig. 5, looking in the direction of the arrows;

Fig. 25a is an upright section on the line, 25a—25a, on Fig. 25;

Fig. 26 is a longitudinal section on the line, 26—26, of Fig. 5, looking in the direction of the arrows;

Fig. 27 is a transverse, upright section on the line, 27—27, of Fig. 5, looking toward the right;

Fig. 27a is an upright section on the line, 27a—27a, of Fig. 27;

Figs. 28 and 29 are, respectively, a plan and a longitudinal section of the jib yoke separated from other parts, the section being on the line, 29—29, of Fig. 28;

Fig. 30 is an upright, transverse section on the line, 30—30, of Figs. 2 and 5, looking toward the right;

Figs. 31 and 32 are detail views of a nut and gears shown in the left hand part of Fig. 30, Fig. 32 being a section on the line, 32—32, of Fig. 31;

Fig. 32a is a detail elevation of a part of the nut shown in Figs. 31 and 32;

Fig. 33 is an upright, transverse section on the line, 33—33, of Figs. 1 and 4, looking toward the left;

Fig. 34 is a detail section on the line, 34—34, of Fig. 33, looking toward the left;

Fig. 35 is an enlarged detail section through one side of the conveyor frame, on the line, 33—33, of Figs. 1 and 4;

Fig. 36 is a detail section on the line, 36—36, of Fig. 2, illustrating the joint by which the forward frame section of the forward conveyor is hinged to the rear frame section of said conveyor;

Fig. 37 is a sectional plan showing a pair of hydraulic cylinders and flexible tubes joining said cylinders;

Figure 21:
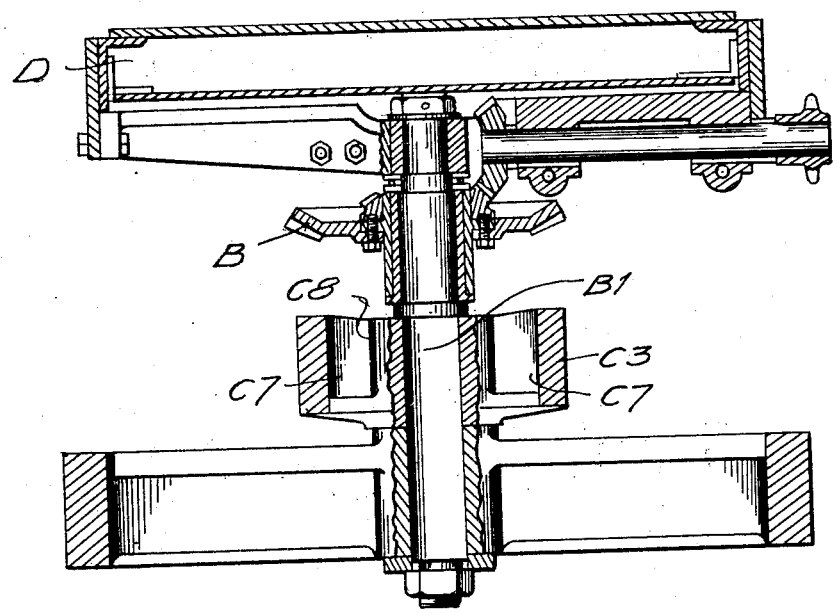
Fig. 21 is a transverse section on the line, 21—21, of Figs. 3 and 6.
Figure 20:
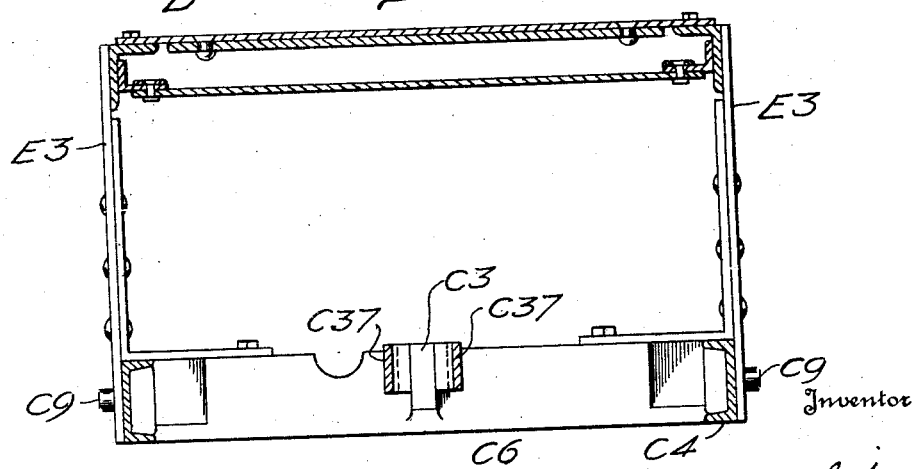
Fig. 20 is an upright, transverse section on the line, 20—20, of Figs. 15 and 19.

The machine consists of six principal sections or groups of mechanical members, (1) the main frame or body, A; (2) the transmission mechanism, B, on the body, A; (3) the rear conveyor, D; (4) the jib, C; (5) the forward or jib conveyor, E; and (6) the shovel, F.

The main frame or body, A, is supported on four ordinary wheels, A1, adapted to rest on ordinary track rails, A2, or on the ground or floor. These wheels support axles, A3. The rear part of the jib, C, is swiveled on an upright axis on the main frame, A. Forward of said upright axis, the jib rests on a horizontal track which is supported on the main frame and is concentric to said upright axis.

The shovel, F, is applied to the forward end of the jib. The rear end of the shovel is supported on an axis which is horizontal and at right angles to the length of the jib. The forward conveyor, E, extends from the rear of the shovel rearward and upward to or nearly to the upright axis on which the jib turns. The forward end of the rear conveyor, D, is under the rear end of the forward conveyor and extends thence rearward beyond the rear end of the main frame or body any distance suitable for discharge into a car placed at the rear of the machine. Fig. 3 of the drawings shows the rear part of this conveyor broken away. That conveyor is not concerned with the present invention.

*The shovel*

At the forward end of each side rail, E5, of the forward frame section, E2, a steel casting bearing piece, F12, is attached to the outer face of said rail by means of three bolts, F13. (Figs. 1, 5a, 7, 8 and 9). Each of these bearing pieces includes a horizontal bearing, F14, on a common axial line which is horizontal and at right angles to the length of said jib-frame. A horizontal shaft, F3, is supported in and has its ends projecting through said bearings, F14. A sleeve, F4, surrounds the shaft within the bearing, F14, and extends outward around the shaft to the end of said bearing. The forward part of each bearing, F14, is rounded concentric with the shaft, F3. Thus there is formed a semi-circular face which is upright and parallel to the length of the machine and directed toward the other bearing. (Figs. 8 and 9.) A cast steel boot, F15, is curved to be concentric with the shaft, F3, and has its ends bearing against each lateral face of each bearing, F14, and having its outer curved face flush with the outer curved face of said bearing. (Figs. 5a, 6a, 11 and 13.) Cap screws, F16, extend horizontally through the bearings into the end of the boot. This connection between the boot, F15, and the bearings extends from the lower part of each bearing to or a little above the horizontal plane of the axis of the shaft, F3. The function of this boot is to shield the forward lower part of the conveyor belt or apron, G2, and to aid in guiding lading material upward during the upward movement of the shovel, as will be described further on.

The shovel, F, is shown detached and in perspective in Fig. 12. At each end, the shovel has an upright wall, F1, terminating above in an ear, F2, which surrounds the adjacent projecting end of the shaft, F3, and bears against the outer face of the bearing, F14. The shovel is hung to oscillate bodily on the shaft, F3, through the range shown in the upright section, Fig. 11.

The end walls, F1, are connected by the forward transverse lading wall, F5, and the lower transverse connecting wall, F6, those walls being shown integral. The lower wall may be regarded as the segment of a cylinder wall formed concentric to the shaft, F3. Between its horizontal borders the wall, F5, is curved rearward. Its lower part meets the forward edge of the wall, F6, at an acute angle to form a shovel lip, F7. The wall, F5, rises to meet the outer or forward face of the boot, F15, and the curved face of the bearing, F14, and move along said faces during the oscillations of the shovel. The boot is to extend downward far enough to continue to be covered by the wall, F5, when the shovel is in its rear position and the boot is to extend upward far enough to meet the wall, F5, when the shovel is in its upper position, in order that lading material carried upward by the shovel will be free to slide downward on the wall, F5, onto the conveyor apron, G2.

The curved bottom part, F6, of the shovel extends rearward far enough to cause it to continue to overlap the curved upper face of the lower wall, F10, of the housing when the shovel has been moved into its upper position. This is for the purpose of avoiding making an opening between the shovel and the housing which would allow material to pass rearward over the lip, F11, and the lower wall, F10, of the housing and hinder or prevent the return of the shovel into its lower position. Thus the shovel is free to oscillate rapidly while all the material in front of this part of the machine is kept in front of the shovel and the lip of the housing. Thereby the machine may constantly be pressed forward for bringing the lip of the housing and the retreated shovel under the material resting on the floor.

At each junction of the rear edge of the lower shovel wall, F6, and the end walls, F1, are a pair of bearings, F17, placed on a common axial line parallel to the shaft, F3, for connecting pitman rods, F18, described further on.

Rearward of each bearing, F14, the bearing piece, F12, has an outer upright wall, the outer face of which is in an upright plane which freely passes the adjacent end of the shaft, F3, and the adjacent end wall, F1, and bearing, F2, of the shovel. To the outer face of said outer wall is applied an upright wall, F8, of the shovel housing and secured to said wall by three bolts, F9. Each wall, F8, extends forward beyond the adjacent bearing, F14, and downward in front of the space occupied by the lip, F7, of the shovel when the shovel is in its lower position. (Figs. 1, 4, 5a, 6a and 10.) From the upright plane of the shaft, F3, rearward, the lower edge of the wall, F8, extends a little below and is concentric with the wall, F6, of the shovel. Forward of the plane of said shaft, the lower part of the wall, F8, is horizontal.

The lower parts of the wall, F8, are connected by a lower stationary wall, F10, whose upper face is concentric with the shaft, F3, and spaced a little from the shovel wall, F6. The forward part of said lower wall extends forward of the position occupied by the shovel lip, F7, when the shovel is in its lower position. Forward of the lip, F7, when in the lower position, the upper face of the wall, F10, slants in approximate continuity with the slant of the forward face of the wall, F5, of the shovel until the lower face of the wall, F10, is met. Thus a lip, F11, is formed.

A wing plate, F8a, secured to each upright wall, F8, and troughing side plates, E5a, complete the conveyor trough. (Figs. 1, 4, 6a and 14.)

At each side of the forward part of the jib is an approximately horizontal pitman rod, F18, having at its forward end a bearing, F19, extending between and into alignment with the bearings, F17. A cross pin, F20, extends through the bearings, F17 and F19. At the rear end of the right hand pitman rod is a bearing, F21, which receives a wrist-pin, F22, extending horizontally outward on the sprocket wheel, F23, fixed on the right hand end of the horizontal shaft, F24, which rests in bearings, F25, supported on the yoke, C24, (described further on). On the opposite end of the shaft, F24, is a crank, F22a, coupled to the left hand pitman rod, F18. A sprocket chain, F26, surrounds the sprocket wheel, F23, and a smaller sprocket wheel, F27, is mounted on the shaft, F28.

The right hand part of the shaft, F28, rests in a bearing, F29, which is supported on the right hand side rail, C4. A bearing, F30, on the left hand side rail, C4, supports the left hand part of said shaft. An oblique bearing, F31, rests on the bridge member, C5. The bearings, F29 and F31, are joined by an arm, F32. On the center casting, C3, is a bearing, F33, in alignment with the bearing, F31. An oblique shaft, F34, is supported in the bearings, F31 and F33, each end of said shaft extending through the adjacent bearing. On the forward end of the shaft, F34, is fixed a small bevel gear wheel, F35, which meshes with a larger bevel gear wheel, F36, surrounding and fixed on the shaft, F28. On the rear end of the shaft, F34, is fixed a bevel pinion, F37, which meshes with the larger bevel gear wheel, B. The transmission of motion from the motor, M, to the upright shaft, B1, and said bevel gear wheel, B, is described under the heading, "Transmission from motor to main bevel wheel".

It will now be seen that when the bevel wheel, B, is rotated there will be transmission of motion from the wheel, B, through the train of mechanism above described to the pitman rods, F18, and the shovel, F, that transmission being continuous, whereby the oscillation of the shovel proceeds without interruption, the forward movement of the pitman rods pushing and the rearward movement of said rods pulling the shovel.

Jib

The jib, C, comprises two sections, the forward section, C2, being hinged to the rear section, C1, on a horizontal axis, whereby the forward end of the forward section may be raised and lowered, whereby the axial line of the shovel may be adjusted to different elevations.

The rear jib section, C1, has for its principal elements a center casting, C3, and two metal channel-form side rails, C4, and a front transverse bridge member, C5, and a rear transverse bridge member, C6. The rear part of the casting, C3, has oblique arms, C7, meeting at and supporting on the middle line of the frame an upright bearing, C8. (Figs. 2, 5, 15, 16, 17 and 19.) The sides of this casting are straight and extend into the channels of the side rails, C4, the flanges of each side rail being directed toward the opposite side rail. Bolts, C9, extend through the upright webs of the side rails and the adjacent sides of the center casting. (Figs. 15 and 16.) The forward part of the casting, C3, is substantially straight and horizontal and perpendicular to the side rails. In each forward corner of this casting is an opening, C11, to receive a roller, C12. (Figs. 15 and 18.) At each side of each such opening are bearings, C13, for the axles, C14, of said rollers. These rollers are to rest on and travel on the gear segment plate, C15, which is fixed on the forward part of the main frame, A, of the machine. (Fig. 22.) The bearing, C8, (Figs. 15, 16 and 21) loosely surrounds the upright shaft, B1, which is supported on the main frame as shown by Fig. 3. This support of the casting, C3, on the shaft or king pin, B1, and on the gear segment plate, C15, allows lateral turning of the casting, C3, and the entire jib on the axial line of the shaft, B1. Means for thus laterally moving the jib and holding it when it has been brought into a desired position will be described further on.

The bridge member, C5, mentioned above, is a casting of angle-form cross section with one flange horizontal and the other flange turned downward at the forward edge of the horizontal flange. (Figs. 5, 15, 16, 23, 24 and 30.) The ends of this member are T-form and extend into the channels of the side rails, C4. Bolts, C17, extend through the end arms of this bridge member, C5, and through the upright web of the side rails C4.

The bridge member, C28, is between the bridge member, C5, and the forward ends of the side rails, C4. This is of channel form with the web upright and the flanges directed rearward. (Figs. 15 and 16.) At each end of the bridge member, C28, a gusset plate, C18, is placed on top of the member, C28, and the upper face of the adjacent side rail, C4, and secured to said members by means of bolts or rivets, C19. (Figs. 5, 15 and 16.)

Jib yoke

At the forward end of the side rails, C4, a bearing, C20, has an arm, C21, laid against the inner face of the rail, C4, and secured thereto by means of rivets, C22. A shaft, C23, extends from one of said bearings to the other and through said bearings and the rails, C4, and the adjacent plate, E4, each end of said shaft projecting far enough to also extend into or through the adjacent bearing, C25, on the yoke, C24, each such bearing being against the outer face of the adjacent side rail, C4. (Figs. 5, 15, 19, 27, 28 and 29.) Each of said bearings is extended upward on the yoke, C24, far enough and in the form of an ear to bring the yoke below the level of the side rails, C4.

The yoke, C24, is a single steel casting comprising the bearings, C25, and the horizontal, longitudinal arms, C27, and the transverse bridge member, C28, meeting the arms adjacent said bearings. (Figs. 28 and 29.)

Rearward of said bridge member, C28, the yoke arms, C27, extend obliquely toward each other and meet to form a fork, C29, which has an upright slot, C30, and transverse horizontal bearings, C31, on a common axial line. This fork receives the lower end of a screw shaft, C32. (Figs. 2, 5 and 30.) A pintle, C33, extends horizontally through the bearings, C31, and the lower end of said screw shaft. (Fig. 2.)

On the bridge member, C5, midway between its ends, is a block, C34, (Figs. 5, 15 and 16) which is secured by upright bolts, C35, extending through said block and the horizontal flange of the bridge member, C5. On the front face of the bridge member, C6, (Figs. 15 and 16) midway between the side rails or on the middle longitudinal line of the frame is an ear, C36. Two bars, C37, are placed horizontally and at each side of and against the block, C34, and the ear, C36. Bolts, C38, extend horizontally through said bars and the block, C34, to bind said bars to said block. A bolt, C39, extends through the ear, C36, and the adjacent ends of said bars. In each of said bars and in the same horizontal axial line is a bearing, C40. Each of said bearings receives a journal, C41, on the swivel piece, C42. (Figs. 30, 31, 32 and 32a.) Between said journals the swivel piece is tubular on an upright axis to form a bearing, C43, for the rotary nut, C44, having a shoulder, C45, seating on the annular shoulder, C46, formed in the upper ends of the bearing, C43. Above the shoulder, C45, and integral with the upper end of the rotary nut, C44, is a miter gear wheel, C47, which meshes with the miter gear wheel, C48, which is fixed on the adjacent end of the shaft, C49, which projects through the horizontal bearing, C50, which is a part of the swivel piece, C42. At the end of said bearing opposite the wheel, C48, is a collar, C51, to limit movement of the shaft toward said bearing. (Figs. 30 and 31.) The shaft, C49, extends through a bearing in a plate, C52, rising from the right hand side rail, C4. (Figs. 5 and 30.) Said shaft extends through said plate and on said end is fixed the hand wheel, C53.

The interior of the nut, C44, is screw threaded to fit the threads of the screw shaft, C32. (Figs. 2 and 30.)

It will now be seen that by turning the hand wheel, C53, in one direction, the miter gear, C48, will cause the turning of the tubular nut, C44. That nut being held rotatably to prevent upward and downward movement in the swivel piece, C42, it follows that the screw shaft, C32, will be moved upward or downward, according to the direction of rotation of the hand wheel.

The tubular nut, C44, is divided transversely between its ends, and one of the meeting faces is provided with notches, C54, while the other of said faces is provided with teeth, C55, adapted to fit into said notches. (Figs. 30, 31 and 32a.) For assembling, the upper part of said nut is seated in the upper part of the bearing, C43. Then the lower part of said nut is pushed upward into said bearing in position to cause the teeth, C55, to enter the notches, C54. Then the screw shaft is entered into the lower part of the nut and turned to cause it to move upward through the two sections or parts of said nut. When that has been done, the threads of the screw shaft hold the two parts of the nut together.

On the lower end of the nut, C44, is a circumferenial flange, C56. Between that flange and the lower end of the swivel piece, C42, is placed a ball thrust bearing, C62, to resist upward movement of the rear end of the yoke and to permit easy turning of the tubular nut, C44. In a machine built according to this improvement, this yoke adjustment allows placing the shovel below the top of the rails on which the machine is supported, or the shovel can be raised considerably above the rails.

Between the forward ends of the parallel arms of the yoke, C24, is a bridge-form casting, C57, of angle cross section, one of the flanges being above and slanting to conform to the slant of the forward conveyor frame, and the other flange extending downward. (Figs. 1, 4, 33 and 34.) At each end this casting has a downward directed blade, C58, extending over the inner face of the adjacent arm of the yoke, C24, and secured thereto by rivets or bolts, C59. Approximately in the plane of this blade, C58, is an upward directed blade, C60. At the meeting of these two blades is an outward-directed flange, C61, which rests on the upper edge of the adjacent arm, C24, and forms an additional supporting means for the bridge-form casting, C57. This casting forms a support for the forward jib frame, said frame occupying the space between the two blades, C60, the upright flange of the rails, E5, of said frame resting loosely on the body of the bridge-form casting, C57, whereby sliding of said frame on said bridge is permitted.

*Forward or jib conveyor*

The forward or jib conveyor, E, is divided into a rear frame section, E1, and a forward frame section, E2. The main members of these frame sections are the side rails, E5. These rails are of angle cross section, one flange being upright at the side of the frame and the other flange being above and directed inward or toward the opposite side rail. The rear frame section, E1, is supported by resting the rear ends of the side rails, E5, on the forward ends of the side rails, C4, C4, of the jib, C. At the rear end of each side rail, C4, a relatively large metal plate, E3, is riveted to the outer face of said rail and rises high enough to overlap the outer face of the angle-form side rail, E5, of the frame sections, E1. (Figs. 2, 5, 15, 19 and 17.) At the forward end of each side rail, C4, a metal plate, E4, is riveted to the adjacent outer face of said rail and extended upward to overlap and be riveted to the adjacent angle-form side rail, E5, of the rear frame section, E1. The rear end of the forward frame section, E2, is hinged to the forward end of the rear frame section by means of a fork, E6, riveted to the rear end of each forward frame section side rail. Each fork is directed rearward and receives a tongue, E7, seated on the forward end of the adjacent side rail, E5, of the rear frame section. At each fork, E6, a bolt, E8, extends through the fork and the tongue, E7. The hinge thus formed constitutes the rear support for the forward frame section, E2. The forward part of the frame section, E2, as already described, rests loosely on the bridge-form casting, C57, between the upright blades, C60. This frame section is thus seated loosely on the bridge member, C57, to allow relative sliding between said bridge member and said frame section when the yoke, C24, is tilted by the raising or lowering of the screw shaft, C32, already described. The upper floor plate, E9, of each frame section rests on the horizontal flange of each side rail, E5, and is secured thereto by means of cap screws, E10, extending through the spring steel strip, E11, and the plate, E9, and into said flange. (Figs. 33 and 35.)

*Conveyor apron*

At the inner end of each bearing, F14, a sprocket wheel, G, surrounds and is keyed to the shaft, F3. At the rear end of the jib conveyor is a transverse shaft, G3, seated in bearings, G4. On that shaft are fixed sprocket wheels, G5, near each side rail of the conveyor frame. Sprocket chains, G1, of the endless conveyor belt or apron, G2, extend around the sprocket wheels, G and G5. The left hand end of the shaft, G3, projects outward through the adjacent bearing. A sprocket wheel, G6, surrounds and is fixed to said end of the shaft. A sprocket chain, G7, surrounds said wheel and the sprocket wheel, G8, on the outer end of the shaft, F28, which is rotatable in bearings, F29 and F30, on the side rails, C4, of the main jib frame, as already described. It is to be understood that the structure of the conveyor apron may be varied to suit the material to be handled by the machine.

*Moving jib sidewise*

The gear segment plate, C15, has already been described as being applied horizontally on the forward part of the main frame, A, and forming a track for the rollers, C12, (Figs. 6, 15 and 18.)

A bridge casting, H1, extends from the left hand part of the forward edge of the casting, C3, to the left hand part of the bridge member, C5. (Figs. 5, 23 and 25.) At its forward end this casting has a horizontal cross head, H2, resting flatwise on the bridge member, C5, and secured thereto by bolts, H3. The rear end of the casting, H1, has an upright cross head, H4, (Fig. 25) which bears flatwise against the adjacent upright forward face of the bridge casting, C3, and is secured thereto by means of cap screws, H5. Adjacent the cross head, H4, the casting, H1, has an upright bearing, H6, in which is a short shaft, H7, on the lower end of which is fixed a small spur gear wheel, H8, which meshes with the gear teeth on the segment gear plate, C15. (Figs. 23, 25 and 25a.) Said shaft extends above the bearing, H6, far enough to receive a worm wheel, H9, which is keyed on said shaft. In the bearings, H10, H10, rests the worm shaft, H11, having a worm, H12, meshing with the worm wheel, H9. Said shaft extends forward through the forward bearing, H10. A bevel friction wheel, H13, surrounds and is fixed on said end of said shaft. At opposite sides of the wheel, H13, and surrounding the shaft, F28, are two larger friction bevel gear wheels, H14 and H15, joined by a common hub, H16, the wheels, H14 and H15, being separated to allow them to be positioned without engaging the bevel gear wheel, H13. Said wheels and said hub are keyed on said shaft, F28, to permit endwise sliding on the shaft and to compel rotation with the shaft, so that said wheels rotate whenever the shaft rotates. On the right hand side of the friction wheel, H15, is a hub, H17, which has a circumferential channel which receives a shift ring, H18, on which are radial studs, H19, extending into the shift lever, H20. (Figs. 5 and 26.) Said lever is duplex—composed of two bars one lying on the other and bolted or riveted together and separated to span the shift ring, H18, and each having a hole to receive one of the studs, H19, on the shift ring, H18. At the forward end of said lever, said bars are separated sufficiently to form a fork, H20a, embracing the triangular bracket plate, H21, extending horizontally rearward from the bridge member, C28. A pintle, H21a, extends through said fork and said bracket plate. At the rear end of the lever, the two bars are separated to form a fork to receive a swivel nut, H22, having diametrically opposite radial studs, H23, extending into bearings, H24, in the lever, H20. The swivel nut receives the threaded end of the screw shaft, H25. The rear end of the upper bar of said lever is extended beyond the swivel nut to form a tongue, H26, to over-lap the transverse rod, H27, which has its ends supported in the upright plates, E3, already described as supporting the rear end of the rear jib section. The outer or right hand end of the screw shaft, H25, extends rightward through the adjacent upright plate, E3. On each side of said plate, said shaft is surrounded by a fixed collar, H28, for holding the shaft against endwise movement. On the outer end of said shaft, H25, is a small sprocket wheel, H29, which is connected by a sprocket chain, H30, with a sprocket wheel, H31, on a short horizontal shaft, H32, resting in a bearing in a standard, H33, supported on the right-hand side of the forward conveyor frame. (Figs. 2 and 2a.) On the outer end of the shaft, H32, is fixed a hand wheel, H34.

By turning the hand wheel, H34, and thus through the sprockets and chain turning the shaft, H25, in one direction, the swivel nut, H22, and the lever, H20, are moved sidewise and the friction gear wheels, H14 and H15, are moved endwise in one direction. (Fig. 5.) The reverse movement of said parts takes place when said hand wheel is turned in the opposite direction. If the movement of the wheels, H14 and H15, is toward the left to engage the wheel, H15, with the wheel, H13, the wheel, H13, and the worm shaft, H11, and the worm, H12, and the wheels, H9 and H8, are turned for causing the wheel, H8, to traverse the segment gear, C15, in one direction, whereby the jib is moved in that direction. Movement of the jib in the opposite direction results when the friction wheels, H14 and H15, are moved so as to engage the wheel, H14, with the wheel, H13. When the jib is to be held at rest, the hand wheel and screw shaft, H25, are turned so as to bring both wheels, H14 and H15, out of engagement with the wheel, H13, the wheels, H14 and H15, being, as above stated, spaced from each other far enough to permit such disengagement. Then the wheel, H13, and the worm shaft, H11, and the worm, H12, are idle and the worm holds the worm wheel, H9, and the short shaft, H7, and the small spur gear wheel, H8, locked, whereby the jib is locked against sidewise movement.

The jib conveyor belt is of well-known form and does not require further description.

*Transmission from motor to main bevel wheel*

The main bevel gear wheel, B, already described, meshes with the smaller bevel gear wheel, B2, fixed on the longitudinal, horizontal shaft, B3, resting in bearings, B4 and B5. (Figs. 3, 6, 21 and 21a.) From the shaft, B3, there is transmission to the bevel gear wheel, B6, through the clutch members, B7 and B8, the wheel, B6, having a hub, B9, extending through the bearing, B5, and loosely surrounding the shaft, B3, and extending into and keyed to the clutch member, B7. The clutch member, B8, is keyed for endwise sliding on said shaft. An expanding coil spring, B10, surrounding the shaft, B3, between the hub of the clutch member, B8, and the nut, B11, normally presses the member, B8, into the member, B7. The member, B8 may be forced in the opposite direction by means of the lever, B12, pivoted at its upper end to the bracket, B13, and surrounding the hub of the clutch member, B8, and bearing studs resting loosely in a circumferential groove in the hub of the member, B8, in the well-known manner. Said bracket is joined to the lever by means of cross pins, B14. Said bracket is fixed on the frame member, A4. By turning the lever, B12, forward or toward the spring, B10, the clutch member, B8, is moved out of engagement with the clutch member, B7.

To the lower end of the lever, B12, is coupled the rear end of a horizontal link, B16, by means of a cross-pin, B15. (Figs. 21a and 21b) extending forward and surrounding an eccentric, B17, on a horizontal shaft, B18, on the outer or right hand end of which is the upright hand lever, B19. (Fig. 3.) By means of said hand lever and eccentric, the link, B16, may be shifted horizontally for shifting the lever, B12, as will now be understood.

The bevel gear wheel, B6, meshes with a bevel gear wheel, B20, on the horizontal cross shaft, B21, resting in a left hand bearing, B22, and a right hand bearing, B23. (Fig. 6.) The right hand end of said shaft projects through said bearing. On said end is fixed a large spur gear wheel, B24, which meshes with a smaller spur gear wheel, B25, which is fixed on the shaft of the electric motor, M. When the motor is in motion, there is constant transmission of motion through the shaft, B21, and the bevel wheel, B20, to the bevel gear wheel, B6. From that wheel, motion is transmitted to the shaft, B3, by allowing the clutch member, B8, to engage the clutch member, B7.

*Driving the track wheel axles*

Figure 38:
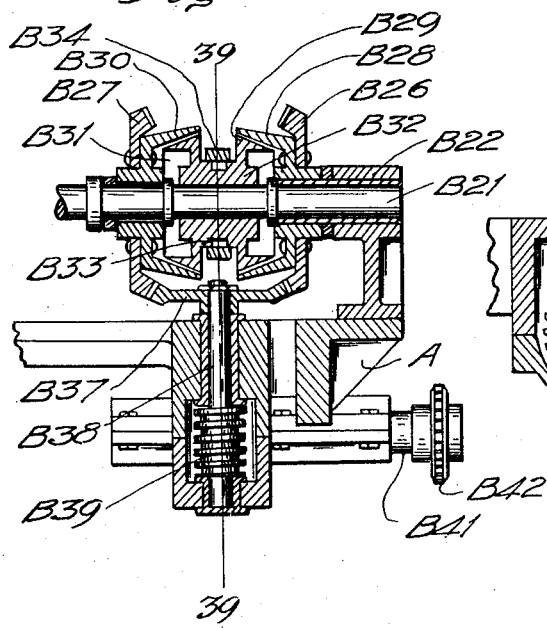
Fig. 38 is a detail section on the line, 38—38, of Fig. 6.
Figure 39:
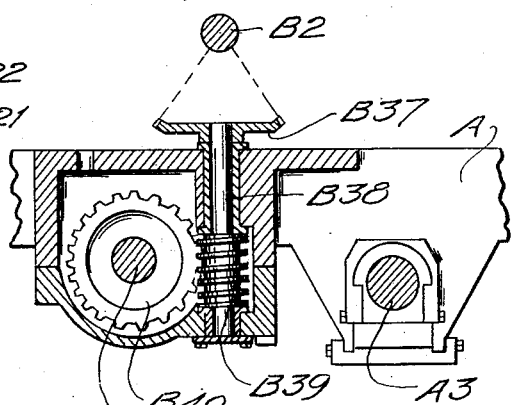
Fig. 39 is a detail section on the line, 39—39, of Fig. 38.

The track wheels, A1, receive motion from the shaft, B21, through the bevel gear wheels, B26 and B27, these wheels being free to turn on said shaft, but held against endwise movement. (Figs. 6 and 38.) On the wheel, B26, is fixed a friction clutch cup, B28, into which extends a conical clutch member, B29. On the wheel, B27, is fixed a friction clutch cup, B30. Into that member extends a cone clutch member, B31. The cone members, B28 and B31, are joined to each other by a common hub, B32, keyed for sliding on the shaft and on which hub is a circumferential groove, B33, in which loosely engages a ring, B34, which is engaged by the arms of a lever, B35, which is pivoted between its ends to a frame member at B36. By tilting said lever, the two cone members are moved in unison toward the right or toward the left, according to the direction of movement of said lever. Thus clutch engagement may be made for rotating either the bevel gear wheel, B26, or the bevel gear wheel, B27. Both of said bevel gear wheels are in mesh with the bevel gear wheel, B37, (Fig. 38) which is located below the clutch and is keyed on the upright shaft, B38, on the lower part of which is the worm, B39, which meshes with the worm wheel, B40, which surrounds and is keyed on the horizontal transverse shaft, B41, which is horizontal and parallel to and a little rearward of the shaft, B21. The shaft, B41, projects outward at the left side of the machine and there bears a sprocket wheel, B42. The adjacent end of the rear wheel axle, A3, projects outward at the left and has fixed on it a sprocket wheel, B43. A sprocket chain, B44, extends around said sprocket wheels. The opposite end of said rear axle projects outward at the right and receives a sprocket wheel, B45. The right hand end of the forward axle, A3, projects similarly and has fixed thereon a sprocket wheel, B45. A sprocket chain, B46, is mounted on these sprocket wheels, B45, B45. When the shaft, B41, is rotated, the two axles, A3, and the track wheels, A1, are rotated through the action of the sprocket chains, B44 and B46, the direction depending upon whether transmission is through the bevel gear wheel, B26 or B27, on the shaft, B21.

The forward end of the lever, B35, is coupled to the left hand end of the horizontal piston stem, B48, which extends into the hydraulic cylinder, B47, which is similar to the hydraulic cylinder, B51. (Fig. 37.) From the cylinder, B47, two flexible tubes, B49 and B50, extend to the hydraulic cylinder, B51. Connected with the piston stem, B48, of the cylinder, B51, is an upright hand lever, B52, by means of which said piston stem may be reciprocated, whereby there is transmission through the tubes, B49 and B50, for reciprocating the piston stem, B48, of the cylinder, B47. The hand lever is near the operator's seat, B53. By means of said hand lever, the operator may at will propel the machine forward and backward, as may be needed for taking the machine toward or from the place of operation or as may be needed during the operation of the machine. During its operation the machine is ordinarily to be driven forward to drive the lip, F10, of the shovel housing under the coal or other material.

The operator's seat, B53, rests on the seat support, B54, which is fixed on the seat platform, B55. Near the seat is the electric controller, B56, joined by suitable wiring to the electric motor, M.

As already stated in connection with the description of the shovel and its associated mechanism, coal will not pass along the floor rearward of the shovel during the upward movement of the shovel. Therefore rearward bodily movement of the machine is not needed after every forward and upward movement of the shovel to prevent the shovel from descending on such coal.

I claim as my invention,

1. In a shoveling machine, the combination with a supporting structure, of a shovel hung to the forward part of said structure on a line which is horizontal and transverse to said structure and extends through the upper part of the shovel and is at a height to allow the shovel to be below and oscillate on and below said line, and means engaging the shovel below the level of said line to oscillate said shovel.

2. In a shoveling machine, the combination with a supporting structure, of a shovel hung to the forward part of said structure on a shaft which is in a line which is horizontal and transverse to said structure and extends through the upper part of the shovel and is at a height to allow the shovel to be below and oscillate on and below said line, and means engaging the shovel below the level of said shaft to oscillate said shovel.

3. In a shoveling machine, the combination with a supporting structure, of a shovel hung to the forward part of said structure on a line which is horizontal and transverse to said structure and extends through the upper part of the shovel and is at a height to allow the shovel to be below and oscillate on said line, and endwise reciprocable members coupled to the shovel below the level of said line.

4. In a shoveling machine, the combination with a supporting structure, of a shovel hung to the forward part of said structure on a shaft which is in a line which is horizontal and transverse to said structure and extends through the upper part of the shovel and is at a height to allow the shovel to be below and oscillate on said line, and endwise reciprocable members coupled to the shovel below the level of said line.

5. In a shoveling machine, the combination with a supporting structure, of a shovel hung to the forward part of said structure on a line which is horizontal and transverse to and fixed relative to said structure and extends through the upper part of the shovel and is at a height to allow the shovel to be below and oscillate on and below said line, and means engaging the shovel below the level of said line to oscillate said shovel.

6. In a shoveling machine, the combination with a supporting structure, of a shovel hung to the forward part of said structure on a shaft which is in a line which is horizontal and transverse to and fixed relative to said structure and extends through the upper part of the shovel and is at a height to allow the shovel to be below and oscillate on and below said line, and means engaging the shovel below the level of said shaft to oscillate said shovel.

7. In a shoveling machine, the combination with a movable jib, of a shovel hung to the forward part of the jib on a line which is horizontal and transverse to said structure and extends through the upper part of the shovel and is at a height to allow the shovel to be below and oscillate on and below and rearward of the upright plane of said line and forward of said plane to approximately the level of said line, and means engaging the shovel below the level of said line to oscillate said shovel.

8. In a shoveling machine, the combination with a jib, of a shovel having bearings in a line which is horizontal and transverse to said structure and extends through the upper part of the shovel and is at a height to allow the shovel to be below and oscillate on and below and rearward of the upright plane of said line and forward of said plane to approximately the level of said line, a shaft supported on the jib and resting in said bearings, and means engaging the shovel below the level of said shaft to oscillate said shovel.

9. In a shoveling machine, the combination with a supporting structure, of conveying mechanism, a shovel located at the forward end of said conveying mechanism and hung to the forward part of said structure on a line which is horizontal and transverse to said structure and extends through the upper part of the shovel and is at a height to allow the shovel to be below and oscillate on and below and rearward of the upright plane of said line and forward of said plane to approximately the level of said line, and means engaging the shovel below the level of said line to oscillate said shovel.

10. In a shoveling machine, the combination with a supporting structure, of conveying mechanism, a shovel located at the forward end of said conveying mechanism and hung to the forward part of said structure on a shaft which is in a line which is horizontal and transverse to said structure and extends through the upper part of the shovel and is at a height to allow the shovel to be below and oscillate on and below and rearward of the upright plane of said line and forward of said plane to approximately the level of said line, and means engaging the shovel below the level of said shaft to oscillate said shovel.

11. In a shoveling machine, the combination with a supporting structure, of a shovel hung to the forward part of said structure on a line which is horizontal and transverse to said structure and at a height to allow the shovel to be below and oscillate on and below and rearward of the upright plane of said line and forward of said plane to approximately the level of said line, means in operative relation with said shovel to oscillate said shovel, and a boot located parallel and concentric to said line and between said line and the path of said shovel.

12. In a shoveling machine, the combination with a supporting structure, of a shovel hung to the forward part of the structure on a line which is horizontal and transverse to said structure and at a height to allow the shovel to be below and oscillate on and below said line and said shovel comprising upright end walls terminating in upper horizontal bearings on said horizontal line and comprising a lower member joining said end members and being concentric with said line and said shovel also comprising a forward lading wall joined to said concentric wall and being downward curved and extending nearly to said bearings, and means for oscillating said shovel.

13. In a shoveling machine, the combination with a supporting structure, of a shovel hung to the forward part of the structure on a line which is horizontal and transverse to said structure and extends through the upper part of the shovel and is at a height to allow the shovel to be below and oscillate on and below and forward of said line for discharge at approximately the level of said line and said shovel comprising a forward lading wall, and a boot located between said shovel and said line and concentric to said line and adjacent the shovel.

14. In a shoveling machine, the combination with a supporting structure, of a bearing piece at each side of and supported by said structure and each comprising a horizontal bearing on a common horizontal axial line which extends through the upper part of the shovel, a shaft resting in said bearings, a boot located forward of and concentric to said shaft and secured to said bearings, a shovel hung to oscillate on and below said axial line and forward of said line for discharge at approximately the level of said line, and means in operative relation with said shovel to oscillate said shovel.

15. In a shoveling machine, the combination with a supporting structure, of a shovel having upper bearings and rear lower ears, means supporting said bearings on a line which is horizontal and transverse to said structure and extends through the upper part of the shovel and is at a height to allow the shovel to be below and oscillate on and below said line, and means in operative relation with said ears to oscillate said shovel rearward of the upright plane of said line and forward of said plane for discharge above and across said line.

16. In a shoveling machine, the combination with a jib having fixed side bearing pieces, of a shovel hung to said bearing pieces on a line which is horizontal and transverse to the jib and extends through the upper part of the shovel and is at a height to allow the shovel to oscillate on and below said line, a motor, and transmission means connected with said motor and in operative relation with said shovel below the level of said line for oscillating said shovel across the upright plane of said line to bring its forward part near the level of said line.

17. In a shoveling machine, the combination with a supporting structure, of a shovel hung from a line which is horizontal and transverse to said structure and extends through the upper part of the shovel and oscillating means engaging said shovel below and rearward of the upright plane of said line and forward of said plane to approximately the level of said line.

18. In a shoveling machine, the combination with a supporting structure, of a shovel hung to said structure on a horizontal line which extends through the upper part of the shovel, and power-driven oscillating means engaging the shovel below the level of said line.

19. In a shoveling machine, the combination with a supporting structure, of a shovel hung from a line which is horizontal and transverse to said structure and extends through the upper part of the shovel, and oscillating means engaging the lower part of said shovel for pushing the shovel forward and pulling it backward.

20. In a shoveling machine, the combination with a supporting structure, of a shovel hung to said structure on a horizontal line which extends through the upper part of the shovel, and power-driven oscillating means engaging the shovel below the level of said line for pushing the shovel forward and pulling it backward.

21. In a shoveling machine, the combination with a supporting structure, of a suspended reciprocable shovel, and stationary means serving to prevent material from moving rearward of the shovel during the movements of the shovel.

In testimony whereof I have signed my name, this 25th day of February, in the year one thousand nine hundred and thirty.

WILLIAM WHALEY.